US012707211B2

(12) United States Patent
Johansen et al.

(10) Patent No.: US 12,707,211 B2
(45) Date of Patent: Aug. 11, 2026

(54) HEARING DEVICE FOR PLACEMENT IN THE EAR HAVING A RECEIVER

(71) Applicant: GN Hearing A/S, Ballerup (DK)

(72) Inventors: Jan Johansen, Køge (DK); Henrik Nielsen, Roskilde (DK); Thomas John Chappell, Frederiksberg C (DK); Timea Denisa Merca, Køge (DK); Thomas Olsgaard, Holte (DK)

(73) Assignee: GN Hearing A/S, Ballerup (DK)

( * ) Notice: Subject to any disclaimer, the term of this patent is extended or adjusted under 35 U.S.C. 154(b) by 150 days.

(21) Appl. No.: 18/116,307

(22) Filed: Mar. 2, 2023

(65) Prior Publication Data

US 2023/0362562 A1 Nov. 9, 2023

(30) Foreign Application Priority Data

Mar. 31, 2022 (DK) .......................... PA 2022 70150
Mar. 31, 2022 (EP) .................................... 22165766

(51) Int. Cl.
*H04R 25/00* (2006.01)

(52) U.S. Cl.
CPC ......... *H04R 25/652* (2013.01); *H04R 25/604* (2013.01); *H04R 2225/0216* (2019.05); *H04R 2460/11* (2013.01)

(58) Field of Classification Search
CPC .... H04R 25/652; H04R 25/604; H04R 25/60; H04R 25/65; H04R 25/654;
(Continued)

(56) References Cited

U.S. PATENT DOCUMENTS 4,729,451 A 3/1988 Brander et al.
6,484,842 B1 11/2002 Widmer et al.
(Continued)

FOREIGN PATENT DOCUMENTS

CN 202077178 12/2011
CN 102972044 3/2013
(Continued)

OTHER PUBLICATIONS

Extended European Search Report for EP Patent Appln. No. 22165766.1 dated Sep. 19, 2022.
(Continued)

*Primary Examiner* — Ahmad F. Matar
*Assistant Examiner* — Sabrina Diaz
(74) *Attorney, Agent, or Firm* — Vista IP Law Group, LLP

(57) ABSTRACT

An in-the-ear (ITE) part includes: a connector for coupling with a BTE part; a hollow earmould comprising a front end, a rear end, and a hollow cavity, wherein the front end of the earmould is configured to face a tympanic membrane of the user, the front end comprising a front opening, the front opening comprising a front filter, the rear end comprising a rear opening; a receiver in the hollow cavity; a sound passage extending between the front opening and the rear end; an active vent, wherein when the active vent is in an open state, the active vent provides a fluid connection through the sound passage, and wherein when the active vent is in a closed state, the active vent hinders the fluid connection through the sound passage; and a rear filter at the rear opening, or in the hollow cavity between the rear opening and the active vent.

20 Claims, 12 Drawing Sheets

(58) Field of Classification Search

CPC ........ H04R 2225/0216; H04R 2460/11; H04R 1/1016; H04R 1/105

USPC ........ 381/324, 312, 322, 325, 328, 330, 380

See application file for complete search history.

(56) References Cited

U.S. PATENT DOCUMENTS

| | | | | |
|---|---|---|---|---|
| 6,671,381 | B1 | 12/2003 | Lux-Wellenhof | |
| 7,110,562 | B1 | 9/2006 | Feeley et al. | |
| 7,532,733 | B2 | 5/2009 | Saltykov | |
| 11,082,781 | B2 | 8/2021 | Kuipers | |
| 2004/0010181 | A1 | 1/2004 | Feeley et al. | |
| 2008/0152178 | A1* | 6/2008 | Topholm ................ | H04R 25/02 381/330 |
| 2008/0285783 | A1 | 11/2008 | Gebert et al. | |
| 2010/0177919 | A1 | 7/2010 | Giese et al. | |
| 2011/0194716 | A1 | 8/2011 | Gommel et al. | |
| 2015/0078601 | A1* | 3/2015 | Petersen ................ | H04R 25/60 381/325 |
| 2016/0050503 | A1 | 2/2016 | Naether | |
| 2016/0057528 | A1 | 2/2016 | Trine et al. | |
| 2016/0365083 | A1 | 12/2016 | Bao et al. | |
| 2019/0116416 | A1 | 4/2019 | Lawand et al. | |
| 2019/0208301 | A1 | 7/2019 | Monti et al. | |
| 2019/0208343 | A1 | 7/2019 | Monti et al. | |
| 2019/0253793 | A1 | 8/2019 | Pedersen et al. | |
| 2020/0288251 | A1 | 9/2020 | Kuipers | |
| 2020/0329321 | A1 | 10/2020 | De Ruijter et al. | |
| 2021/0044910 | A1* | 2/2021 | Kuipers ............... | H04R 25/652 |
| 2021/0092536 | A1 | 3/2021 | Roeck et al. | |
| 2022/0248117 | A1 | 8/2022 | Chang et al. | |
| 2022/0256280 | A1* | 8/2022 | Kuipers ............... | H04R 1/1016 |

FOREIGN PATENT DOCUMENTS

| | | | | |
|---|---|---|---|---|
| CN | 106878894 | | 6/2017 | |
| CN | 113812172 | | 12/2021 | |
| EP | 3429231 | A1 | 1/2019 | |
| EP | 3637799 | | 4/2020 | |
| EP | 3637799 | A1 * | 4/2020 | ........... H04R 25/652 |
| KR | 101363989 | B1 | 2/2014 | |
| WO | WO 2022/019752 | | 1/2022 | |

OTHER PUBLICATIONS

Extended European Search Report for EP Patent Appln. No. 22165768.7 dated Sep. 21, 2022.

Extended European Search Report for EP Patent Appln. No. 22165765.3 dated Aug. 8, 2022.

Non-Final Office Action for U.S. Appl. No. 18/110,675 dated Feb. 26, 2025.

Phonak ActiveVent Receiver Brochure [online]. Sonova AG, 2021 [archived at web.archive.org on Aug. 25, 2025]. Retrieved from theinternet <URL: https://web.archive.org/web/20210825055234/ https://www.phonak.com/content/dam/celum/72827/72829/PH_Brochure_ActiveVent_210x280_EN_V2.00_028-2308-02.pdf> (Year: 2021).

Phonak ActiveVent Assembly Instructions [online]. Sonova AG, 2021 [archived on Jan. 18, 2022]. <URL: https://web.archive.org/web/20210825055234/ https://www.phonak.com/content/dam/celum/72827/72829/PH_Brochure_ActiveVent_210x280_EN_V2.00_028-2308-02.pdf> (Year: 2022).

Non-Final Office Action for U.S. Appl. No. 18/110,891 dated Mar. 25, 2025.

Final Office Acton for U.S. Appl. No. 18/110,675 dated Aug. 6, 2025.

Foreign Exam Report for EP Patent Appln. No. 22165768.7 dated Jun. 18, 2025.

Foreign OA for CN Patent Appln. No. 202310336866 dated Oct. 14, 2025.

Non-Final Office Action for U.S. Appl. No. 18/110,675 dated Nov. 7, 2025.

Foreign Search Report for CN Patent Appln. No. 202310330163.5 dated Nov. 14, 2025 (with English translation).

Non-Final Office Action for U.S. Appl. No. 18/110,891 dated Jan. 2, 2026.

Foreign OA for CN Patent Appln. No. 202310340161.4 dated Nov. 25, 2025 (with English translation).

Final Office Action for U.S. Appl. No. 18/110,675 dated Feb. 11, 2026.

Extended European Search Report for EP Patent Appln. No. 26157402.4 dated Apr. 28, 2026.

Florian 18: "Phonak Launch: Der neue ActiveVent Receiver und CROS Paradise pro.meinhoergeraet.de", dared Aug. 18, 2021 (Aug. 18, 2021), pp. 1-4, XP093275683, Retrieved from the Internet: URL:https://pro.meinhoergeraet.de/ produkte/phonak-launch-der-neue-activevent-receiver-und-cros-paradise/523.

Non-Final Office Action for U.S. Appl. No. 18/110,675 dated May 6, 2026.

* cited by examiner

HEARING DEVICE FOR PLACEMENT IN THE EAR HAVING A RECEIVER

RELATED APPLICATION DATA

This application claims priority to, and the benefit of, Danish Patent Application No. PA 2022 70150 filed on Mar. 31, 2022, and European Patent Application No. 22165766.1 filed on Mar. 31, 2022. The entire disclosures of the above applications are expressly incorporated by reference herein.

FIELD

The present disclosure relates to an in-the-ear (ITE) part configured for placement at least partially within an ear canal of the user, the ITE part comprising: a connector configured for coupling to a BTE part configured to be worn behind a pinna of a user, a hollow earmould comprising: a front end, a rear end, and a hollow cavity, the earmould being configured for the front end to be positioned facing a tympanic membrane of the user during use, the front end comprising a front opening, the front opening comprising a front filter, and the rear end comprising a rear opening. The ITE part further comprising: a receiver arranged in the hollow cavity, a sound passage extending between the front opening and the rear end, and configured to allow for fluid connection between the front opening and an exterior of the hollow earmould, an active vent comprising a valve, the valve is positioned at the front end, and the active vent is configured to have an open state and a closed state, wherein the valve, in the open state, provides a fluid connection through the sound passage, wherein the valve, in the closed state, hinders fluid connection through the sound passage, and a rear filter arranged at the rear opening, or in the hollow cavity and in-between the rear opening and the valve of the active vent.

BACKGROUND

Some hearing devices have an in-the-ear (ITE) part that is placed at least partly within an ear canal of the user of the hearing device. In this way, the receiver, i.e. speaker unit, within the ITE part can be brought to sit relatively close to the tympanic membrane of the ear canal during use. A nuisance often occurring when part of a hearing device sits in the ear canal is occlusion, whereby the blocking of the ear canal causes the user to experience unwelcome sounds when they speak or chew.

One way to mitigate occlusion is to use an open-fit hearing device, where the ITE part has one or more vents configured to allow air, and thereby sound, to escape the ear canal. However, the open fit also allows sound to enter the ear canal of the hearing device user, which can cause a number of problematic issues such as making it more difficult to control the sound delivered by the hearing device to the user; For example, the sound delivered by the hearing device may not be heard above the ambient sound or it may be distorted due to mixing with the ambient sound.

A solution to this is having an active vent within the ITE part, where the active vent can open or close one or more valves, either manually or automatically, in response to a given situation that the user is in. Thus, in a situation, where it is favourable for the user, the vent may be in an open state to permit air (and thereby sound) to pass through the ITE part, e.g. to diminish occlusion and/or allow for the user to maintain environmental awareness. In other situations, the vent may be in a closed state to close off ambient sound from entering the user's ear canal, e.g. to provide a more optimal transmission of the sound produced by the receiver, and/or to prevent sound, such as sound produced by the receiver, from exiting the earmould into the exterior. An ITE part having an active vent, however, is a complex system with a number of challenges many of which depend on the design of the ITE part.

There is thus a need for an improved ITE part comprising an active vent.

It is an object to provide an improved ITE part comprising an active vent.

It is a further object to provide an improved configuration of an ITE part comprising an active vent.

It is a further object to provide a hearing device comprising the improved ITE part comprising an active vent.

SUMMARY

In a first aspect is provided an in-the-ear (ITE) part configured for placement at least partially within an ear canal of the user, the ITE part (1) comprising a connector configured for coupling to a BTE part configured to be worn behind a pinna of a user. The in-the-ear (ITE) part may at least partly be shaped to conform to at least part of the ear canal of the user. The ITE part further comprises a hollow earmould having a front end, a rear end opposite the front end, and a hollow cavity. The earmould is configured for the front end to be positioned facing a tympanic membrane of the user during use. The front end has a front opening with a front filter that is configured to hinder contaminants from entering the earmould through the front opening. Contaminants may be e.g. humidity, dirt, hair, oily substances, where oily substances can be e.g. ear wax, i.e. the front filter may be a cerumen grid. The front filter may be removable such that it can be replaced if needed.

The ITE part further comprises a receiver, which is arranged in the hollow cavity and is configured such that sound produced by the receiver travels through the front opening and the front filter. In this way, the receiver is able to deliver sound to the ear canal of the user. The receiver may be housed within a receiver housing/receiver body.

The ITE part may comprise electronic components, which may be comprised e.g. in the receiver housing and/or within the earmould. The ITE part may comprise electronic components and circuits that create, process, and/or cancel audible sound, such as electronic components that act to provide hearing compensation.

A sound passage extends between the front opening and the rear end, and is configured to allow for fluid connection between the front opening and an exterior of the hollow earmould. Thus, the sound passage allows fluid, such as air or liquids, to pass from the exterior of the earmould, i.e. the ambient surroundings of the user, to the front opening during use of the ITE part. In particular, the sound passage may be configured to allow for air to flow between the front opening and an exterior of the hollow earmould, while the earmould is positioned within the user's ear canal.

An active vent comprises a valve, which is positioned at the front end. The active vent is configured to have an open state and a closed state, wherein the valve, in the open state, provides a fluid connection through the sound passage, and wherein the valve, in the closed state, hinders fluid connection through the sound passage. Thus, when in the open state fluid, in particular air, is allowed to pass through the ITE part from the ambient environment to the ear canal of the user. In contrast, in the closed state the passage of fluid, in particular sound, e.g. ambient sound, to the user's ear canal is reduced. The open state may be configured to allow for the valve to be fully open or partially open. The active vent may be configured to being controlled by a vent control arrangement comprised in the ITE part or in the hearing device. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmould. The active vent enables opening or closing of the vent during use of the hearing device and comprises a valve. The valve may be positioned in-between the receiver and the front opening.

The receiver and active vent may be integrated in an active vent receiver. In an active vent receiver the active vent may integrated into the receiver spout, wherein the fluid connection between the front opening and an exterior of the earmould may at least partly go through the inside of the receiver spout, and the valve may comprise one or more through-holes in the receiver spout, which allow for fluid access between the front opening and the hollow cavity, The receiver and active vent may be provided by separate electronic components.

The rear end has a rear opening. A rear filter is arranged at the rear opening, or in the hollow cavity and in-between the rear opening and the valve of the active vent, the rear filter being configured to allow ambient sound to pass therethrough and further configured to hinder contaminants from entering the space between the rear filter and the vent.

The rear filter protects the sentive vent system from contaminants, such as humidity, dirt, hair, oily substances (such as ear wax), and other debris by diminishing the amount of contaminants that can affect the functionality of the valve mechanism from reaching the valve. If the valve becomes too contaminated it may stop functioning entirely or at least be compromised. The rear filter thus has two important features:

keeping contaminants away from critical parts, such as very delicate parts, of the active vent and maintaining the acoustical openness of the ITE part when the active vent is in the open state.

In some embodiments, a hearing device is configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be embodied in various housing styles or form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprise in the ITE unit, which is coupled to the BTE unit via a connector cable or wire configured for transferring electric signals between the BTE and ITE units.

In some embodiments, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In some embodiments, the hearing device may comprise one or more antenna(s) configured for wireless communication. The one or more antenna(s) may comprise an electric antenna. The electric antenna may be configured for wireless communication at a first frequency. The first frequency may be above 800 MHZ, preferably a wavelength between 900 MHz and 6 GHz. The first frequency may be 902

MHz to 928 MHz. The first frequency may be 2.4 to 2.5 GHZ. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHZ. The second frequency may be between 9 MHz and 15 MHz.

In some embodiments, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls.

In an embodiment, the wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing device, e.g., as part of a binaural hearing system and/or from one or more accessory device(s), such as a smartphone and/or a smart watch.

In some embodiments, the hearing device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc.

The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

In some embodiments, the hearing device may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In some embodiments, the wireless communication unit may be configured for converting the second electric output signal into a wireless output signal. The wireless output signal may comprise synchronization data. The wireless communication unit may be configured for transmitting the wireless output signal via at least one of the one or more antennas.

In some embodiments, the hearing device may comprise a digital-to-analogue converter configured to convert the first electric output signal, the second electric output signal and/or the wireless output signal into an analogue signal.

In some embodiments, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In some embodiments, the hearing device may comprise a memory, including volatile and non-volatile forms of memory.

Throughout this text, the term removable is used in connection with various components. It is noted that by the term removable is meant that the component mentioned in connection with the term is intended to be removable and that a user or hearing care professional may remove/detach a component without the use of excessive force.

In some embodiments, the rear end of the earmould is an open shell structure. That is, the rear end is not a closed structure, although in some embodiments the rear filter will be situated at or very near the rear end of the earmould.

In some embodiments, the rear filter comprises a filter mesh, i.e. a filter made from a woven material, or a reticulated foam filter, i.e. a filter having a reticulated foam structure. In some embodiments, the rear filter is made at least in part of reticulated polyurethane foam or reticulated polyester foam. Filter mesh is well suited due to the large surface area of a filter mesh, which means that the acoustical openness is not compromised and therefore, it will behave acoustically as a fully open vented earmould when the valve is in an open state.

In some embodiments, the rear filter is configured to contact one or more inside walls of the hollow earmould. In some embodiments, the rear filter is configured to be removably arranged within the earmould. In some embodiments, the rear filter is removably attached or removably connected to the earmould. The rear filter may be removably attached to a structure within the inner space of the earmould. The rear filter may be removably attached to a component in the earmould. Thus, the rear filter may be exchangeable allowing for a defective or compromised rear filter to be exchanged for a new rear filter. An exchangeable rear filter will improve the functionality of the ITE part and may extend the usable lifetime of the ITE part and/or the hearing device. The usable lifetime of one or more components in the ITE part may be extended by having a replaceable rear filter. For example, the usable lifetime of the active vent may be prolonged as the active vent is, at least partly, protected by the rear filter. The exchangeable rear filter may be exchanged by a user, a hearing aid dispenser, or a technician.

In some embodiments, the ITE part further comprises a faceplate that is attached to the rear end of the earmould. In some embodiments, the faceplate is removably attached to the earmould. The faceplate may be manufactured as a separate component, which is later combined with the earmould. Preferably, the faceplate can be removed from the earmould. A removable faceplate allows the faceplate to be exchanged if needed or desired. Further, a removable faceplate allows access to the inner space of the earmould. The faceplate may be thick or thin when compared to the earmould, and the faceplate may be made of the same material as the earmould or of a different material from that of the earmould.

In some embodiments, the rear filter is incorporated into the faceplate, i.e. the rear filter is part of the faceplate either as an integral part, a firmly attached part, or as a removably attached part. The rear filter may be attached to the faceplate, such as removably attached to the faceplate. Thus, in some embodiments, the rear filter is removably incorporated into the faceplate. Thus, in some embodiments, the faceplate and incorporated filter may both be exchangeable, while in other embodiments only the incorporated filter is exchangeable. The faceplate may cover the entirety of the rear opening or the faceplate may cover part of the rear opening. In some embodiments, the faceplate is configured to allow the connector to extend through the faceplate. The faceplate may be a filter mesh faceplate, i.e. a faceplate comprising a filter mesh.

In some embodiments, the receiver is configured to be removably arranged within the earmould. In some embodiments, the receiver is configured to be removably arranged within the earmould. In some embodiments, the earmould further comprises a filter holding element, which extends from a part of the earmould, the filter holding element being configured to secure the rear filter in place. In some embodiments, the filter holding element extends from the earmould and into the hollow cavity. For example, the filter holding element may extend from an inside wall of the hollow earmould. That is, the earmould, having a hollow cavity, has at least one inside wall from which the filter holding element may extend. In a preferred embodiment, the receiver is exchangeable. An exchangeable receiver allows the receiver to be exchanged if needed or desired. For example, the receiver may be replaced if it is defective, or as part of an exchange or upgrade of part of the ITE part or the hearing device.

In some embodiments, the receiver comprises a receiver body and the rear filter is at least in part attached to the receiver body. The rear filter may be configured to contact one or more inside walls of the hollow earmould while attached to the receiver body. In some embodiments, the rear filter surrounds the receiver body. The rear filter may surround the receiver body entirely.

The ITE part may further comprise a supporting structure configured to hold the receiver housing in place within the earmould. In some embodiments, the filter holding element is integral with the supporting structure, i.e. the structure configured to hold the receiver housing in place is integral with the element configured to secure the rear filter in place.

The supporting structure may be arranged in a variety of ways to achieve the purpose of holding the receiver housing in place within the earmould. In some embodiments, the supporting structure comprises a plurality of supporting structures. The supporting structure may be configured to allow the receiver housing to move, such as when the user talks or chews, which provides increased comfort for the user of the ITE part. In some embodiments, the supporting structure is an integral part of the earmould. Thus, in some embodiments, the supporting structure is made from the same material as the earmould.

In some embodiments, at least part of the supporting structure extends from an inside wall of the earmould.

In some embodiments, at least part of the supporting structure is arranged at the front end and/or at least part of the supporting structure is arranged at the rear end of the earmould.

In some embodiments, the supporting structure is configured to at least partially surround the receiver housing. In some embodiments, the receiver housing comprises a structure that is configured to connect with a part of the supporting structure. In some embodiments, the receiver housing comprises a structure that is configured to connect with a part of the supporting structure that at least partially surrounds the receiver housing. Thus, in some embodiments, the receiver housing comprises an interlocking element configured to interconnect with at least part of the supporting structure. In some embodiments, the active vent is coupled to the receiver housing and the active vent may comprise an interlocking element configured to interconnect with at least part of the supporting structure.

In some embodiments, the supporting structure is configured to suspend the receiver housing within the earmould. The supporting structure may be configured to allow for the receiver housing to have some freedom of movement within the earmould. This will allow the receiver housing to move in response to forces acting on the earmould such as during movement of the user's jaws and may also dampen any vibrations from the receiver. For example, the receiver housing may be arranged within the earmould in such a way that at least part of or most of the outer surface of the receiver housing is not in contact with a supporting structure. For example, the receiver housing may be coupled to the earmould only at the front opening, possibly via an active vent. In some embodiments, the receiver housing is coupled to the earmould only at the front opening, possibly via an active vent, and at a part of the receiver housing arranged furthest from the front opening.

In some embodiments, at least part of the supporting structure is comprised in the front opening. In some embodiments, the supporting structure comprises a fixation tip attached to the front end of the earmould. The fixation tip may be part of the front opening. The fixation tip may be configured to hold the receiver housing in place within the earmould. In some embodiments, the fixation tip comprises the front opening. A fixation tip may be made custom for a user or may be provided as a standard part in a variety of sizes. The receiver housing and/or an active vent coupled to the receiver housing may be held in place at the front opening. In some embodiments, the earmould further comprises a flexible and resilient element that is configured to cushion the receiver housing against an inside wall of the earmould. The flexible and resilient element may comprise a foam material. The cushioning by the flexible and resilient element allows the receiver housing to move, such as when the user talks or chews, which provides increased comfort for the user of the ITE part.

The at least part of the supporting structure, which is comprised in the front opening, may comprise a material that is softer than that of the middle part, and the receiver housing and/or an active vent coupled to the receiver housing may be removably attached to the supporting structure at the front opening.

At least part of the supporting structure may comprise a material that is softer than the material used to make the middle part of the earmould. In some embodiments, the entire supporting structure is made from a material that is softer than the material used to make the middle part of the earmould.

To characterize the hardness of the materials a standard method such as measurements using a Shore durometer may be used. The earmould, or at least the middle part of the earmould, may be a hard earmould comprising, or being made entirely of, a material having a measured hardness of 60-100 shore D, such as of 70-90 shore D, such as of 75-85 shore D. The earmould, or at least the middle part of the earmould, may be made using 3D printing technology. Thus, the earmould, or at least the middle part of the earmould, may be made of a photopolymer resin such as a DLP (Digital light processing) resin.

By a material being softer than another material is meant that it's measured indentation hardness is a lower value. For example, the hardness of the middle part of the earmould and of the materials in the supporting structure may be determined according to a Shore hardness scale. In some preferred embodiments, the earmould is a hard shell earmould. Hard shell earmoulds are commonly used for making custom earmoulds, i.e. earmoulds where at least part of it has been shaped to conform to a particular user's ear canal. Making an earmould as a hard shell makes the earmould more comfortable for the user and the earmould is, in general, more likely to stay in place in a user's ear canal compared to a soft earmould.

In some embodiments, all or part of the earmould, such as the middle part, is configured to at least partially conform to at least part of the ear canal of the user. In some embodiments, the middle part of the earmould is made from an acrylic. In some embodiments, the supporting structure comprises silicone rubber, TPE, TPA, EPDM and/or LSR. In some embodiments, the supporting structure comprises a flexible material configured to stretch so as to accommodate the receiver housing during insertion of the receiver housing within the earmould and to hold the receiver housing in place after insertion. Having a supporting structure made from a softer material than that of the earmould allows for compensation of deviations during manufacture, such as low fidelity print resolution, i.e. for the receiver housing to be inserted in an earmould, which is not itself flexible enough to provide give during insertion and where even a small deviation during manufacture can make it difficult or impossible to insert the receiver housing, especially if the receiver housing is to be removable.

In some embodiments, at least part of the supporting structure is arranged at the rear end of the earmould. The receiver housing takes up a significant part of the available space within the earmould. In particular, some receiver housings have a comparatively large spout diameter, i.e. a comparatively large diameter of the structure, where sound exits the receiver housing. For example, active vent receivers, which have an active vent comprised in the receiver housing, may have a larger spout diameter. Design of an earmould is challenged by the available space within the ear canal of the user, and if the overall dimensions of the earmould grow this may become a problem. For example, an increase in overall dimension of an earmould may reduce the insertion depth of the earmould and also how well it can fit inside the ear canal. Having the supporting structure at the rear end or primarily at the rear end of the earmould may save space at the front of the earmould compared to fixation of the receiver housing at the front end. It may be advantageous to combine a soft material at the front opening providing an acoustic seal between the receiver housing and the earmould with a supporting structure at the middle part or the rear end providing the necessary force to hold the receiver housing in place.

In some embodiments, the receiver or receiver housing comprises a wired connection, which is configured to connect the receiver electronics with other parts of the hearing device, such as with a Behind-the-ear (BTE) part. In some embodiments, the supporting structure is configured to at least partially surround the wired connection. The part of the receiver housing from where the wired connection extends, may comprise a structure, which is configured to connect with a supporting structure.

In some embodiments, the earmould further comprises a faceplate that is attached to the rear end of the earmould. The faceplate may be configured to allow ambient sound from outside the ear canal of the user to pass through it. The faceplate may be removably attached to the earmould. In some embodiments, the supporting structure is comprised in or coupled to the faceplate. In some embodiments, the supporting structure is an integral part of the faceplate.

The receiver housing may be removably arranged within the earmould. Thus, in some embodiments, the supporting structure is configured such that the receiver housing is removably arranged within the earmould. An exchangeable receiver allows the receiver to be exchanged if needed or desired. For example, the receiver may be replaced if it is defective, or as part of an exchange or upgrade of part of the hearing device. Having a removable receiver in the hearing device may extend the usable lifetime of the hearing device and save cost. Further, materials may be saved as the manufacturer may avoid a replacement of the entire earmould and instead replace only parts of the hearing device such as the receiver and/or one or more filters thus making the production and maintenance of the hearing device more sustainable. The user may be able to keep an earmould that fit well even though part of the hearing device such as the receiver housing needed to be replaced. Additionally, as earmoulds can be difficult to fit for a user, the earmould may be part exchanged.

In an embodiment, the receiver housing optionally comprises one or more biometric sensors for retrieving, such as, but not limited to, a pressure signal, a heart-beat rate signal, a snore detection signal. Optionally, the receiver housing further comprises one or more movement sensors e.g. a gyro sensor, an acceleration sensors.

In a second aspect is provided a hearing device comprising: an ITE part according to the first aspect, and a BTE part configured to be worn behind a pinna of a user, wherein the ITE part is coupled to the BTE part via the connector.

BRIEF DESCRIPTION OF THE DRAWINGS

In the following, exemplary embodiments are described in more detail with reference to the appended drawings, wherein.

DETAILED DESCRIPTION

Figure 1A:
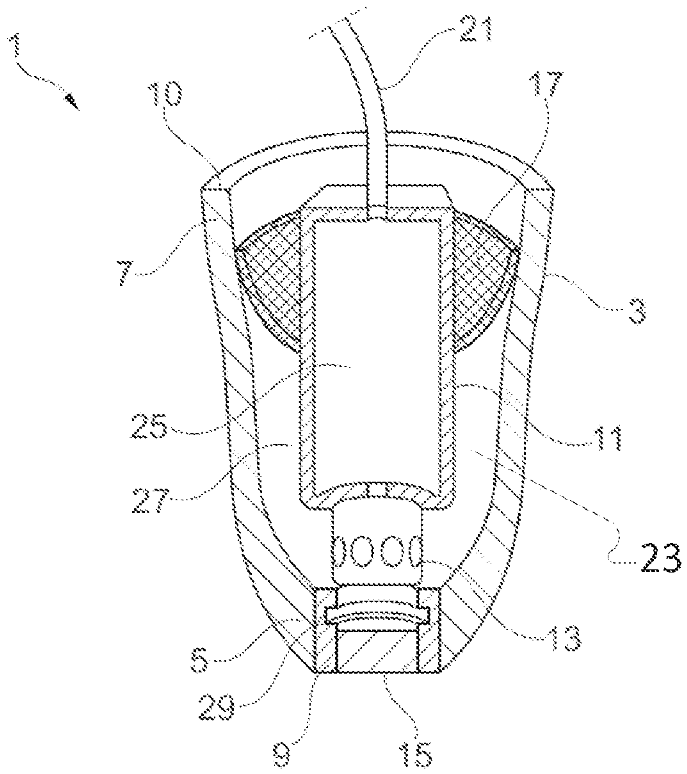
FIGS. 1A and 1B schematically illustrate an ITE part and a connector according to some embodiments, FIG. 2 schematically illustrates an ITE part and a connector according to some embodiments, FIGS. 3A and 3B schematically illustrate an ITE part and a connector according to some embodiments, FIGS. 4A and 4B schematically illustrate a hearing device according to some embodiments, FIGS. 5A and 5B schematically illustrate a hearing device according to some embodiments, FIGS. 6A and 6B schematically illustrate a hearing device according to some embodiments, FIGS. 7A and 7B schematically illustrate a hearing device according to some embodiments, FIGS. 8A and 8B schematically illustrate a hearing device according to some embodiments, FIG. 9 schematically illustrates a hearing device according to some embodiments, FIGS. 10A and 10B schematically illustrate a receiver housing comprising an interlocking element and part of a supporting structure according to some embodiments, FIG. 11 schematically illustrates a hearing device according to some embodiments, and FIG. 12 schematically illustrates a hearing device according to some embodiments.

In the following various exemplary embodiments of the disclosed ITE part, which comprises an earmould, a receiver, a sound passage, an active vent, and a rear filter are described with reference to the appended drawings. The skilled person will understand that the accompanying drawings are schematic and simplified for clarity. The elements shown in the drawings are not necessarily drawn to scale, but may primarily be illustrative of relative position, orientation, and function. Like reference numerals refer to like elements throughout. Like elements will therefore not necessarily be described in detail with respect to each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1B:
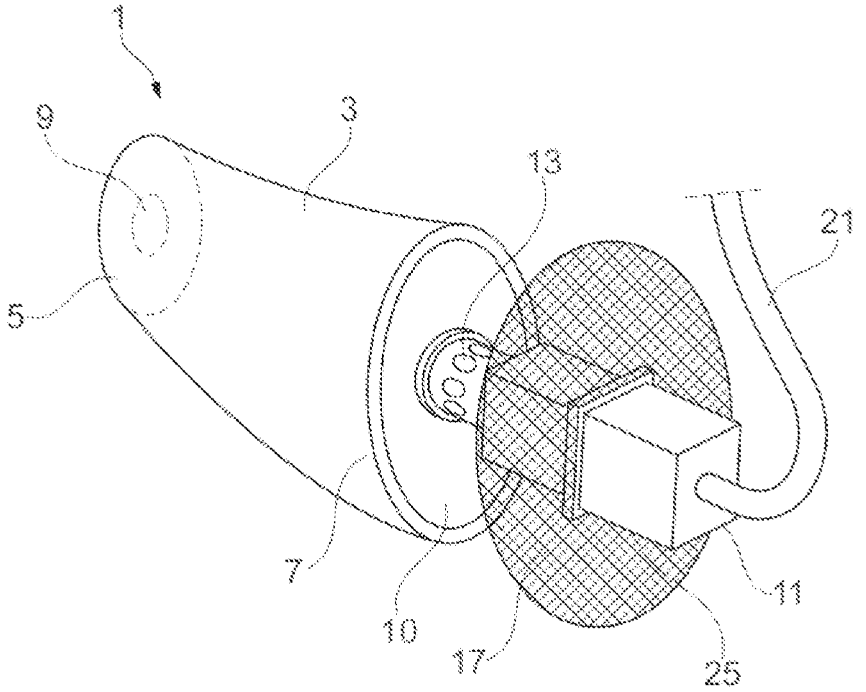

FIGS. 1A and 1B schematically illustrate an ITE part according to some embodiments.

In FIG. 1A is shown an in-the-ear (ITE) part 1 of a hearing device and a connector for coupling a BTE part to the ITE part 1. The ITE part 1 shown has an elongated shape and is configured for placement at least partially within an ear canal of the intended user. The ITE part has a hollow earmould 3, which comprises most of the housing for many of the components in the ITE part. The hollow earmould, and possibly additional elements of the housing may be made from a hard material, such as a hard polymer or a metal, or from a soft material, such as a rubber-like polymer, moulded to have an outer shape conforming to the shape of the specific user's ear canal.

The earmould 3 has a front end 5, having a front opening 9, and a rear end 7, having a rear opening 10, opposite the front end. The rear end is not closed off to the exterior of the earmould such that the earmould has an open shell structure.

The earmould is configured such that the front end can be positioned to face the tympanic membrane of the user's ear canal during use of the hearing device. A receiver within a hollow cavity 23 of the earmould is arranged such that sound produced by the receiver will exit the earmould via a front opening 9 at the front end. A front filter 15 at the front opening diminishes the amount of contaminants that may otherwise enter through the front opening 9. The receiver 11 is secured within the hollow cavity 23 of the earmould by a supporting structure 29. The supporting structure is arranged at the front opening 9 and interlocks with part of the receiver 11 to secure it in place. This supporting structure 29 may be configured such that the receiver can be removed, and possibly exchanged, later, if needed.

The earmould is made to have a sound passage, which extends between the front opening 9 and the rear end 7, to allow for air to move between the front opening and an exterior of the hollow earmould.

The ITE part further has an active vent 13, which has a valve is positioned in-between the receiver 11 and the front opening 9. When the valve in the vent is closed, air is hindered in its movement between the front opening 9 and the rear end 7. Conversely, opening the valve allows air to flow through the sound passage. The receiver 11 and active vent 13 may be integrated in an active vent receiver. The receiver 11 and active vent 13 may be provided by separate electronic components.

A rear filter 17 in the form of a filter skirt is attached to the receiver 11 so as to be positioned in-between the rear opening 10 and the valve of the active vent. The filter skirt extends from the receiver 11 to cover the inner space between the receiver and the inside wall 27 of the earmould 3. To hinder contaminants from bypassing the rear filter, the rear filter 17 may be made of a flexible material, and the rear filter be configured so as to contact the inside wall 27 tightly. For example, the rear filter 17 may be made of a woven material or a foam material.

The rear filter 17 is attached using a bellyband that secures around the receiver body 25. The rear filter 17 can be made to be removable, for example by making it possible to remove the bellyband on which the filter skirt is attached. In this way, the filter skirt can be extracted from within the hollow cavity and cleaned or replaced if needed. The receiver body 25 may comprise one or more protrusions configured to releasably secure the bellyband.

In FIG. 1B is illustrated how the ITE part 1 in FIG. 1A may be assembled. First, a filter mesh or filter foam 17 is attached to the receiver 11 using a bellyband that secures around the receiver body 25. The combined receiver 11 and filter mesh/foam is then inserted into the earmould 3. When the receiver 11 is secured within the earmould 3, the rear filter 17 creates a partition between at least a portion of the inside of the earmould and the exterior from where contamination may arrive. The filter skirt 17 is configured to adapt to the inner shape of the earmould by contacting all around the inside wall 27 of the earmould.

Figure 2:
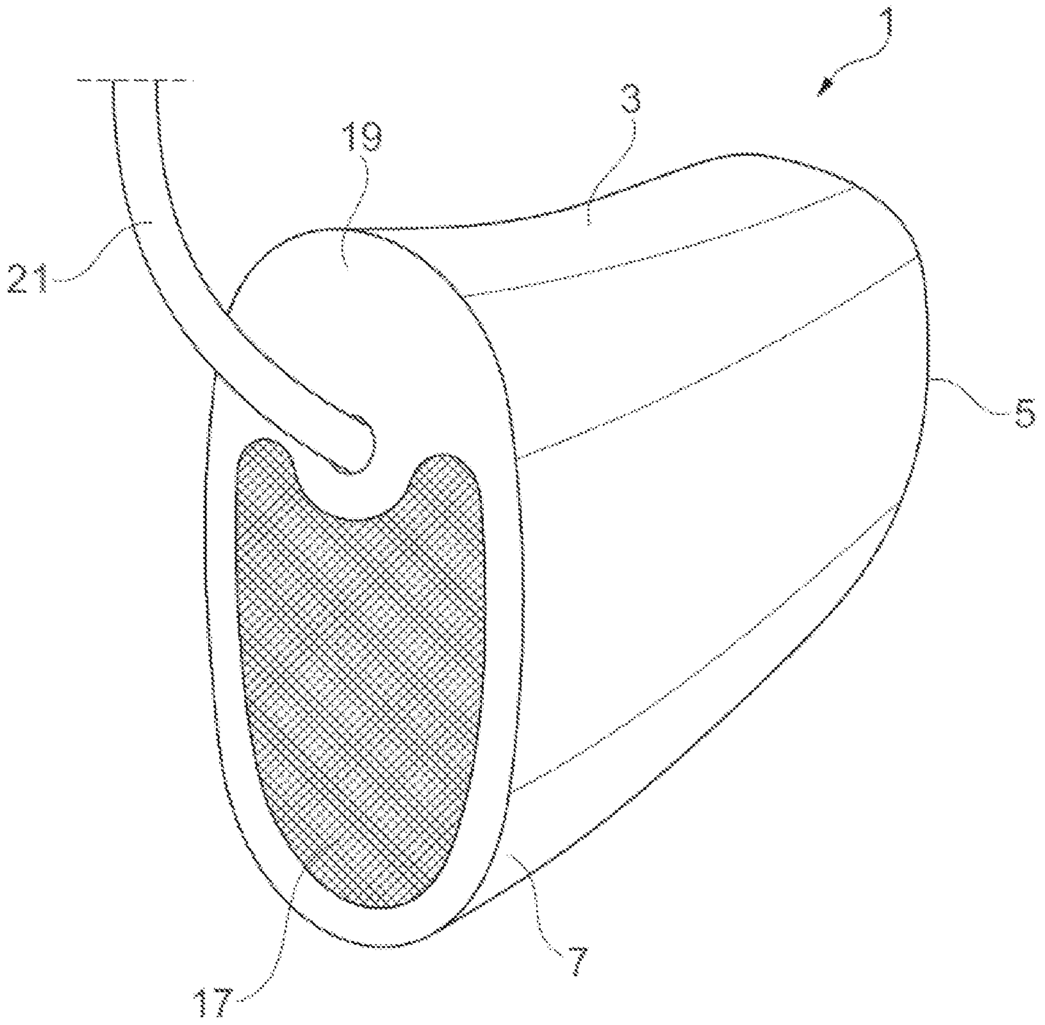

FIG. 2 schematically illustrates an ITE part 1 and a connector 21 according to some embodiments. The ITE part 1 shown has an elongated shape and is configured for placement at least partially within an ear canal of the intended user. The ITE part 1 has a hollow earmould 3, which comprises most of the housing for many of the components in the ITE part. The hollow earmould 3, and possibly additional elements of the housing may be made from a hard material, such as a hard polymer or a metal, or from a soft material, such as a rubber-like polymer, moulded to have an outer shape conforming to the shape of the specific user's ear canal.

The earmould 3 has a front end 5 and a rear end 7 opposite the front end, and the earmould is configured such that the front end can be positioned to face the tympanic membrane of the user's ear canal during use of the hearing device. The earmould 3 is made to have a sound passage, which extends between the front opening 9 and the rear end 7, to allow for air to flow between the front opening and an exterior of the earmould during use.

At the rear end 7 is attached a faceplate 19, which may be permanently attached or removable. The faceplate covers the entirety of the rear end and has a rear filter 17 incorporated into it. The rear filter may be a filter mesh either permanently attached or removably attached to the faceplate. Thus, either the rear filter 17 and/or the faceplate 19 could be removable. A hole in the faceplate 19 allows for the connector 21 to connect to a receiver within the earmould.

If removable, the faceplate 19 could be mechanically secured into the earmould 3, for example with a click or press fit. This allows the entire faceplate 19 to be exchanged, for example to replace the rear filter 17 if it becomes too contaminated in which case it may clog and lose the acoustical transparency required for the functioning of the active vent within the earmould 3.

If permanently attached, the faceplate 17 may be glued or welded to the earmould 3. The rear filter 17 itself may be exchangeable such that the rear filter can be replaced if needed. The removable rear filter 17 may for example be a sticker or a filter that could be mechanically secured into the earmould 3, for example with a click or press fit. For example, the rear filter 17 may be mounted in a frame that fits into a filter frame shaped hole in the faceplate.

The rear filter 17 in the faceplate 19 can be a specially designed filter with the minimum surface area required for the acoustical openness of the system, or it can be made as large as possible within the physical restraints such as the size of the faceplate and allowing for a hole for the connector, etc.

Figure 3A:
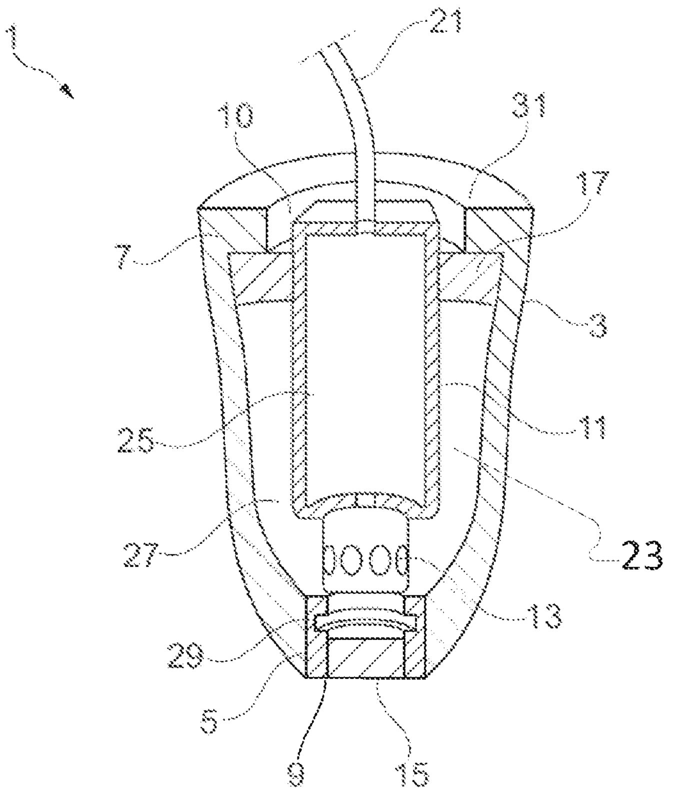
Figure 3B:
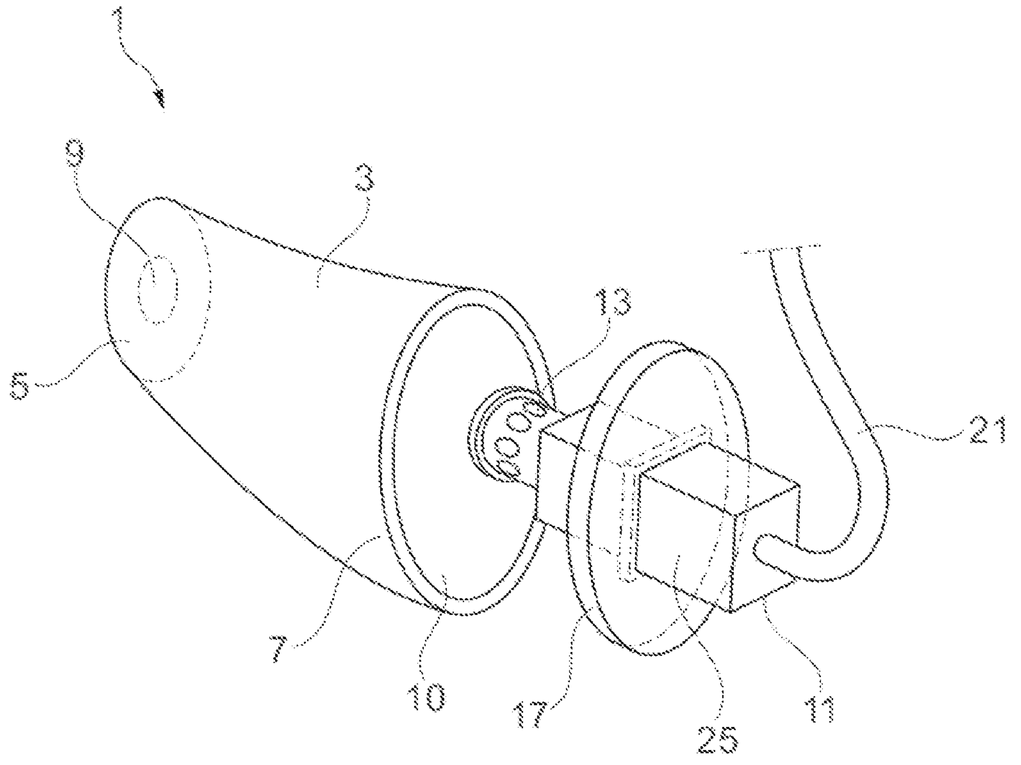

FIGS. 3A and 3B schematically illustrate an ITE part 1 and connector 21 according to some embodiments.

In FIG. 3A is shown an in-the-ear (ITE) part 1 of a hearing device and a connector 21 for coupling a BTE part to the ITE part 1. The ITE part 1 shown has an elongated shape and is configured for placement at least partially within an ear canal of the intended user. The ITE part has a hollow earmould 3, which comprises most of the housing for many of the components in the ITE part. The hollow earmould, and possibly additional elements of the housing may be made from a hard material, such as a hard polymer or a metal, or from a soft material, such as a rubber-like polymer, moulded to have an outer shape conforming to the shape of the specific user's ear canal.

The earmould 3 has a front end 5, having a front opening 9, and a rear end 7, having a rear opening 10, opposite the front end.

The earmould is configured such that the front end can be positioned to face the tympanic membrane of the user's ear canal during use of the hearing device. A receiver within a hollow cavity 23 of the earmould is arranged such that sound produced by the receiver will exit the earmould via a front opening 9 at the front end. A front filter 15 at the front opening diminishes the amount of contamination that may otherwise enter through the front opening 9. The receiver 11 is secured within the hollow cavity 23 of the earmould by a supporting structure 29. The supporting structure is arranged at the front opening 9 and interlocks with part of the receiver 11 to secure it in place. This supporting structure 29 may be configured such that the receiver can be removed, and possibly exchanged, later, if needed.

The earmould 3 is made to have a sound passage, which extends between the front opening 9 and the rear end 7, to allow for air to move between the front opening and an exterior of the hollow earmould.

A rear filter 17 is attached to the receiver 11 and positioned in-between the rear opening and the valve of the active vent. The rear filter extends to cover the inner space between the receiver and the inside wall 27 of the earmould. The rear filter can made to contact the inside wall 27 tightly such that contaminants cannot circumvent the filter. The rear filter 17 could be made of a reticulated foam, such as a foam press filter, that is attached to the receiver body 25 and may be made to be removable. In this way, the rear filter can be removed from the earmould to be cleaned or replaced if needed.

The earmould 3 has a filter holding element 31 in the form of a protruding element, which extends from the inside wall 27 at the rear opening 10. The filter holding element 31 is configured to hold the rear filter 17 in place in the earmould 3, and the protruding element does this by covering at least part of the rear filter.

In FIG. 3B is illustrated how the ITE part 1 in FIG. 3A may be assembled. First, a rear filter 17 is attached to the receiver 11, for example by using a bellyband as described in relation to FIGS. 1A and 1B. The combined receiver 11 and rear filter 17 is then inserted into the earmould 3. When the receiver 11 is secured within the earmould, the rear filter 17 creates a partition between the inside of the earmould and the exterior from where contamination may arrive. The rear filter 17 may be configured to adapt to the shape of the earmould by contacting all around the inside wall 27 of the earmould. The filter holding element 31 described above may be an integral part of the earmould 3 or may be a part that is attached to the earmould. For example, the filter holding element may be mechanically attached to the earmould, such as with a click or press fit attachment configuration.

Figure 4A:
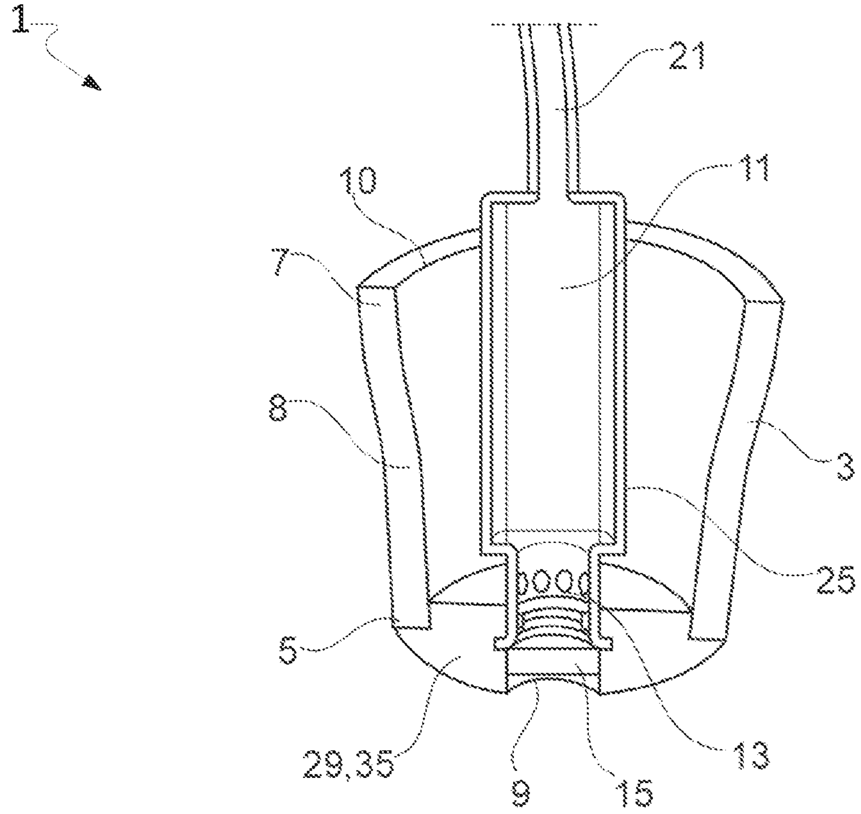
Figure 4B:
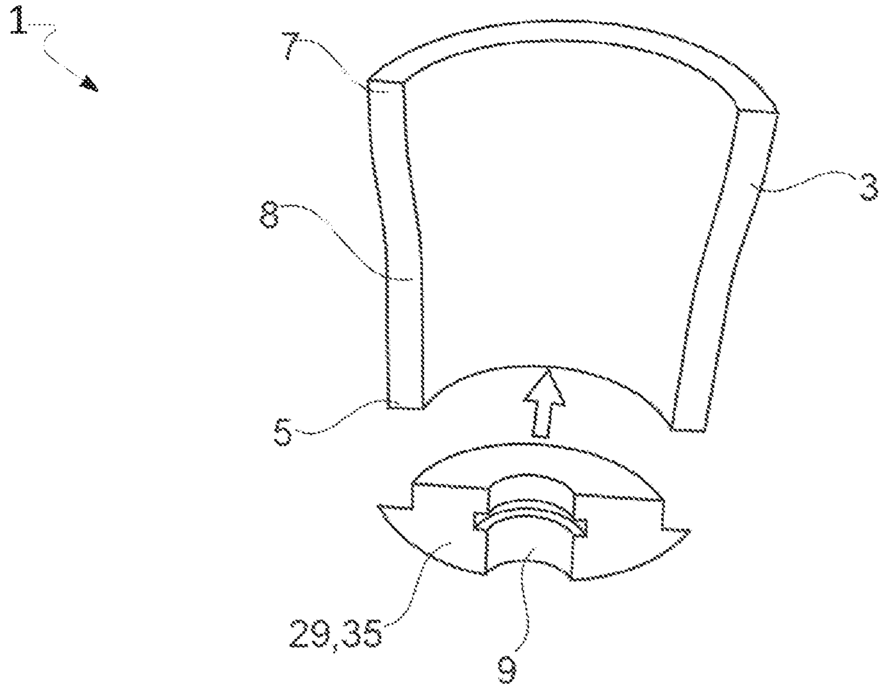

FIGS. 4A and 4B schematically illustrate in a cutaway drawing a hearing device part according to some embodiments.

In FIG. 4A is shown an earmould 3, which may be part of an in-the-ear (ITE) part 1 of a hearing device. A connector 21 connects a receiver 11 within a receiver housing 25 arranged in the earmould 3 to another part of the hearing device, such as a BTE part. The earmould 3 has an elongated shape and is configured for placement at least partially within an ear canal of the intended user. The earmould may be made from a hard material, such as a hard polymer or a metal, or from a soft material, such as a rubber-like polymer, such as an acrylic, and may be moulded to have an outer shape that at least in part conforms to the shape of a specific user's ear canal.

The earmould 3 has a front end 5, having a front opening 9, a rear end 7, having a rear opening 10, opposite the front end, and a middle part 8. The rear end of the earmould 3 in FIG. 4A is not closed off to the exterior of the earmould such that the earmould has an open shell structure.

The earmould is configured such that the front end can be positioned to face the tympanic membrane of the user's ear canal during use of the hearing device. A receiver housing 25 is arranged within the earmould such that sound produced by the receiver will exit the earmould via the front opening 9 at the front end. A front filter 15 at the front opening diminishes the amount of contaminants that may otherwise enter through the front opening 9.

The receiver housing 25 is held within the earmould by a supporting structure 29. The supporting structure 29 comprises a fixation tip 35 attached to the front end of the earmould and the fixation tip is configured to hold the receiver housing 25 in place within the earmould by interlocking with part of the receiver housing 25 to secure it in place. This supporting structure 29 may be configured such that the receiver can be removed, and possibly exchanged, later, if needed.

Optionally, the supporting structure 29 comprises a soft material at the front opening, which has a number of advantages, as it allows the supporting structure to be configured to: provide an acoustic seal between the ear canal of the user and the inner space of the earmould, provide for the receiver housing to be removably attached in the supporting structure, and provide for the receiver housing to have some mobility within the earmould, which increases the comfort for the user.

The earmould is made to have a sound passage, which extends between the front opening 9 and the rear end 7, to allow for air to move between the front opening and an exterior of the earmould. The earmould 3 has an active vent 13, which has a valve that is positioned in-between the receiver 11 and the front opening 9. When the valve in the vent is closed, air is hindered in its movement between the front opening 9 and the rear end 7. Conversely, opening the valve allows air to move through the sound passage. The receiver and active vent may be integrated in an active vent receiver.

A rear filter (not shown) may be arranged so as to be positioned at the rear opening, or to be positioned in-between the rear opening 9 and the valve of the active vent 13. Such a rear filter may be configured to allow ambient sound to pass therethrough and further configured to hinder contaminants from entering the space between the rear filter and the vent. To hinder contaminants from bypassing the filter, the rear filter may be made from a flexible material. For example, the rear filter may be made from a woven material or a foam material. When the receiver housing 25 is secured within the earmould, the rear filter creates a partition between the inside of the earmould and the exterior from where contamination may arrive.

In FIG. 4B is illustrated how an earmould 3 and a supporting structure 29 in the form of a fixation tip 35 may be assembled to produce an assembly prepared for the insertion of a receiver housing to obtain the hearing device part 1 shown in FIG. 4A. A custom-made earmould 3 shaped to fit part of a user's ear canal is attached, for example using an adhesive such as glue, to the softer fixation tip 35. The fixation tip comprises the front opening, which is configures such that the receiver housing 25 can be inserted into it.

Figure 5A:
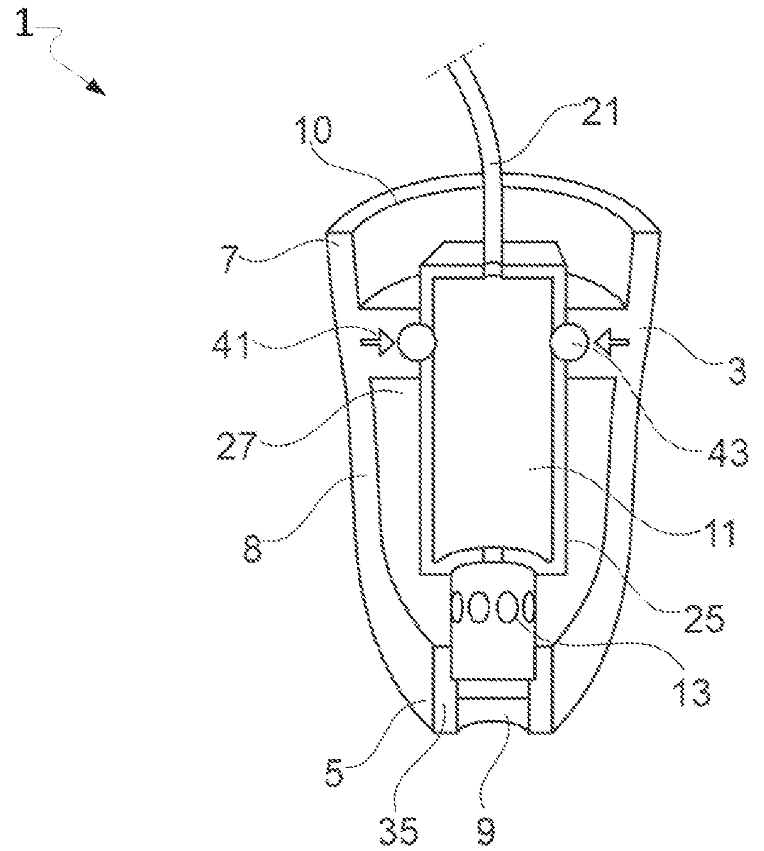
Figure 5B:
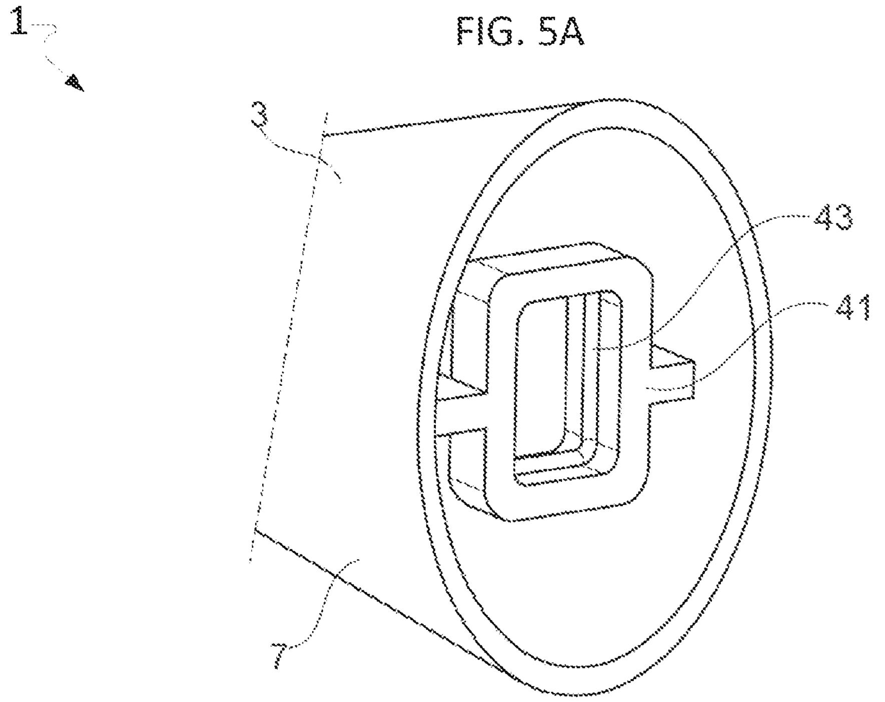

FIGS. 5A and 5B schematically illustrate a hearing device part according to some embodiments.

In FIG. 5A is shown in a cutaway drawing an earmould 3, which may be part of an in-the-ear (ITE) part 1 of a hearing device. A connector 21 connects a receiver 11 within a receiver housing 25 arranged in the earmould 3 to another part of the hearing device, such as a BTE part. The earmould 3 has an elongated shape and is configured for placement at least partially within an ear canal of the intended user. The earmould may be made from a hard material, such as a hard polymer or a metal, or from a soft material, such as a rubber-like polymer, such as an acrylic, and may be moulded to have an outer shape that at least in part conforms to the shape of a specific user's ear canal.

The earmould 3 has a front end 5, having a front opening 9, a rear end 7, having a rear opening 10, opposite the front end, and a middle part 8. The rear end of the earmould 3 in FIG. 5A is not closed off to the exterior of the earmould such that the earmould has an open shell structure.

The earmould is configured such that the front end can be positioned to face the tympanic membrane of the user's ear canal during use of the hearing device. A receiver housing 25 is arranged within the earmould such that sound produced by the receiver will exit the earmould via the front opening 9 at the front end. A front filter may be positioned at the front opening to diminish the amount of contaminants that may otherwise enter through the front opening.

The receiver housing 25 is held within the earmould by a supporting structure, which comprises a plurality of supporting structures 41, 43. A first supporting structure 41 extends from the inside wall 27 closer to the rear end than the front end. Having the supporting structure primarily towards the rear end of the earmould saves space at the front of the earmould, which is advantageous as the available space at the front is usually more limited than at the back. If the front of the earmould has to be made larger, this may reduce the insertion depth of the earmould within the user's ear canal and/or make it more difficult to obtain a good fit for the earmould within the ear canal.

The first supporting structure 41 may be manufactured together with the earmould 3 as a 3D print and may be made from the same material as that used for the earmould 3. A part of the first supporting structure 41 has a shape that allows the receiver housing 25 to fit within it, but is made to be slightly larger than needed such that the receiver housing 25 will fit even if there are small deviations in the print due to e.g. a low fidelity print resolution. The first supporting structure is made to surround the receiver housing, and provides a visual indication of the correct attachment into the earmould.

Optionally, a second supporting structure 41 is made from a material that is softer than the material used to make the earmould. Either or both of the first supporting structure 41 and second structure 43 can be made from a material that is softer than the material used to make the earmould, or at least softer than the material used to make the middle part of the earmould. The first and second supporting structures may have different hardness, i.e. the first supporting structure may have a different hardness than the second supporting structure-even while both the first and second supporting structure is softer than the material used for the earmould, or at least softer than the material used for the middle part of the earmould.

The second supporting structure 43 is shaped as a ring that fits within a groove in the first supporting structure 35. Optionally, the second supporting structure is configured to be able to provide some give, when the receiver housing 25 is inserted into the supporting structure and to provide the retention force necessary to hold the receiver housing within the earmould. The second supporting structure 43 may also be configured to allow the receiver housing to be removed from the supporting structure.

Optionally, the hearing device comprises a soft material at the front opening 9 into which the receiver housing 25, or an active vent 13 coupled to the receiver housing, is inserted, the soft material being configured to provide give during the insertion. The soft material at the front opening can be configured to allow the receiver housing to be removed from the earmould, if needed. The soft material at the front opening 9 may be a fixation tip and so a part of the supporting structure. The fixation tip 35 shown in FIG. 5A is smaller than that shown in FIGS. 4A and 4B.

The receiver housing 25 has an active vent 13 coupled to it, for example it may be an active vent receiver, wherein an active vent is built-in into the receiver. For the active vent to function satisfactorily the soft material at the front opening is configured to provide an acoustic seal between the ear canal of the user and the inner space of the earmould which is open to the exterior of the user's ear canal. This allow for ambient sound to pass from the exterior environment to the ear canal of the user, when the valve within the active vent is in an open state, and for ambient sound to be hindered from entering the ear canal of the user, when the valve is in a closed state.

Further, the soft material at the front opening 9 may be configured to allow the receiver housing and active vent to have some mobility within the earmould, which increases the comfort for the user, while the hearing device is worn.

A rear filter (not shown) may be arranged so as to be positioned at the rear opening, or to be positioned in-between the rear opening 9 and the valve of the active vent 13. Such a rear filter may be configured to allow ambient sound to pass therethrough and further configured to hinder contaminants from entering the space between the rear filter and the vent. To hinder contaminants from bypassing the filter, the rear filter may be made from a flexible material. For example, the rear filter may be made from a woven material or a foam material. When the receiver housing 25 is secured within the earmould, the rear filter creates a partition between the inside of the earmould and the exterior from where contamination may arrive.

In FIG. 5B is shown a view towards the rear end 7 of the earmould 3 that is shown in FIG. 5A. The first and second supporting structures 41, 43 are shown without the receiver housing inserted, whereby the 3D structures are better visualised together with FIG. 5A.

Figure 6A:
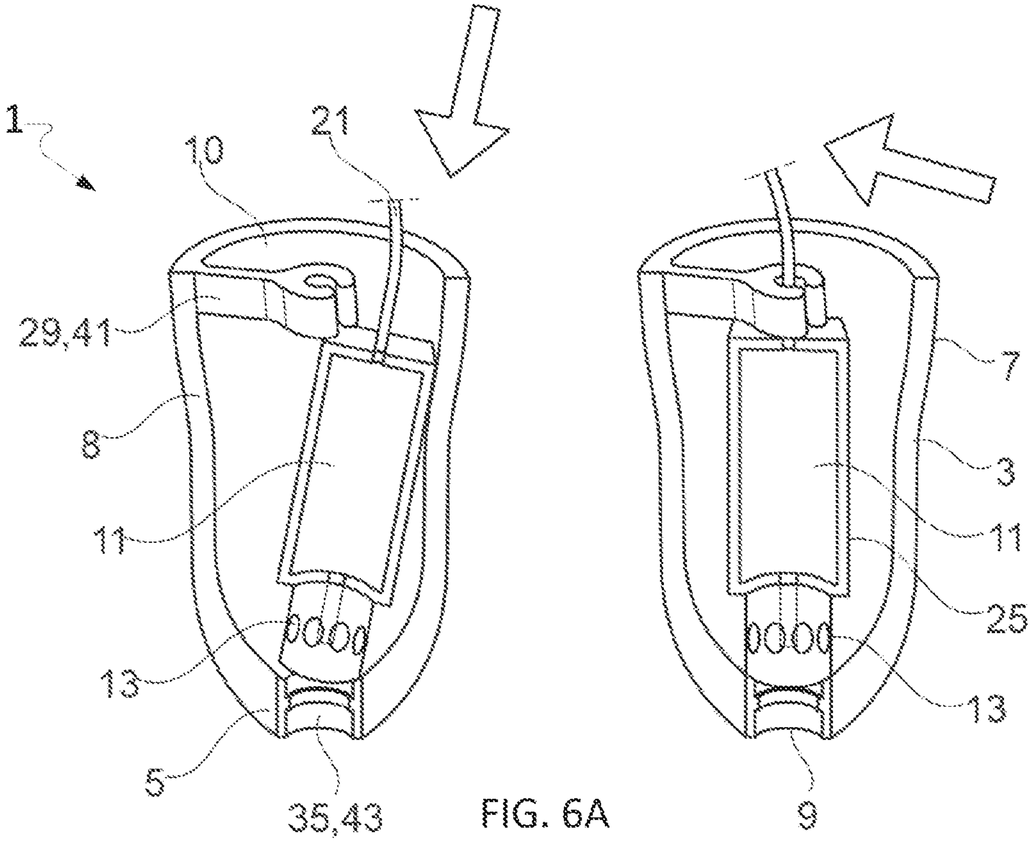
Figure 6B:
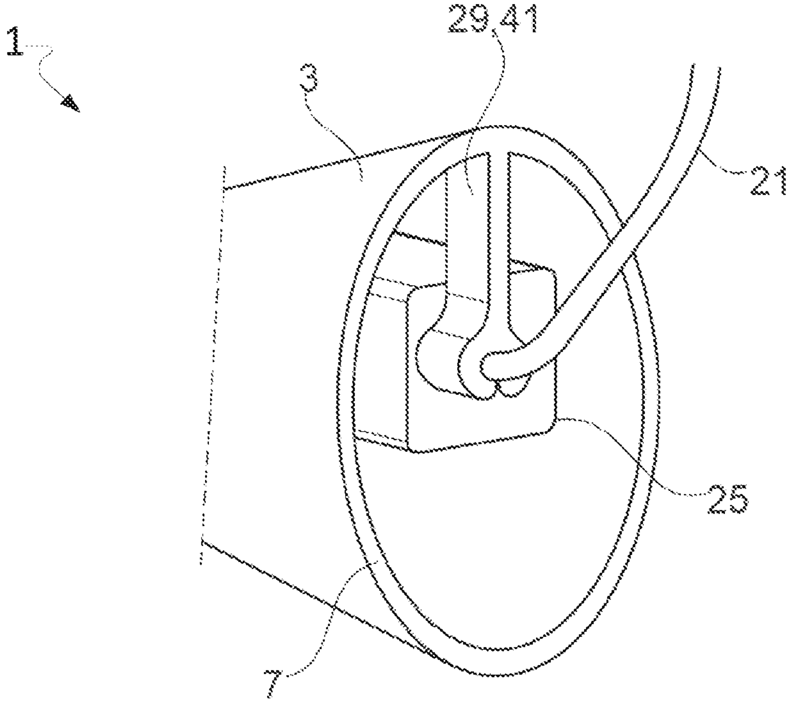

FIGS. 6A and 6B schematically illustrate a hearing device part according to some embodiments.

In FIG. 6A is shown in a cutaway drawing an earmould 3, which may be part of an in-the-ear (ITE) part 1 of a hearing device. A connector 21 connects a receiver 11 within a receiver housing 25 arranged in the earmould 3 to another part of the hearing device, such as a BTE part. The earmould 3 has an elongated shape and is configured for placement at least partially within an ear canal of the intended user. The earmould 3 and receiver housing 25 may be largely as described above in connection with FIG. 5A and the receiver may be an active vent receiver.

The receiver housing 25 is held within the earmould by a supporting structure. A supporting structure 29 extends from the inside wall 27 closer to the rear end than the front end and comprises a material that is softer than the material used to make the middle part of the earmould. The supporting structure may be attached to the earmould using an adhesive such as e.g. glue. Having the supporting structure primarily towards the rear end of the earmould saves space at the front of the earmould, which is advantageous as the available space at the front is usually more limited than at the back. If the front of the earmould has to be made larger, this may reduce the insertion depth of the earmould within the user's ear canal and/or make it more difficult to obtain a good fit for the earmould within the ear canal.

The supporting structure 29 has a shape that allows part of the wired connection 21 to fit within it. The supporting structure 29 is configured such that it will provide give to allow the wired connection 21 to be inserted into it, but also configured such that once inserted the supporting structure will provide the retention force to hold the wired connection 21 such that the receiver housing in held in place within the earmould.

A structure arranged at the front 5 of the earmould holds the receiver housing, or active vent coupled to the receiver housing, in place at or near the front opening 9, for example, but not limited to, a soft material at the front opening 9 as described above.

Alternatively, the embodiment in FIG. 6A shows an embodiment in which the supporting structure comprises a plurality of supporting structures. A first supporting structure 41 extends from the inside wall 27 closer to the rear end than the front end and may be manufactured together with the earmould 3 as a 3D print and may be made from the same material as that used for the earmould 3, which must then provide enough give for the wired connection to be inserted into the first supporting structure 41. A second supporting structure 43 is arranged at the front end 5 of the earmould and comprises a material that is optionally softer than the material used to make the earmould. The second supporting structure 43 may be a fixation tip and the second supporting structure may be configured to provide an acoustic seal between the ear canal of the user and the inner space of the earmould.

FIG. 6B shows a view towards the rear end 7 of the earmould 3 shown in FIG. 6A to show another view of the (first) supporting structure(s) 29, 41 with the wired connection 21 retained within the supporting structure such that the receiver housing 25 is held in place within the earmould 3.

Figure 7A:
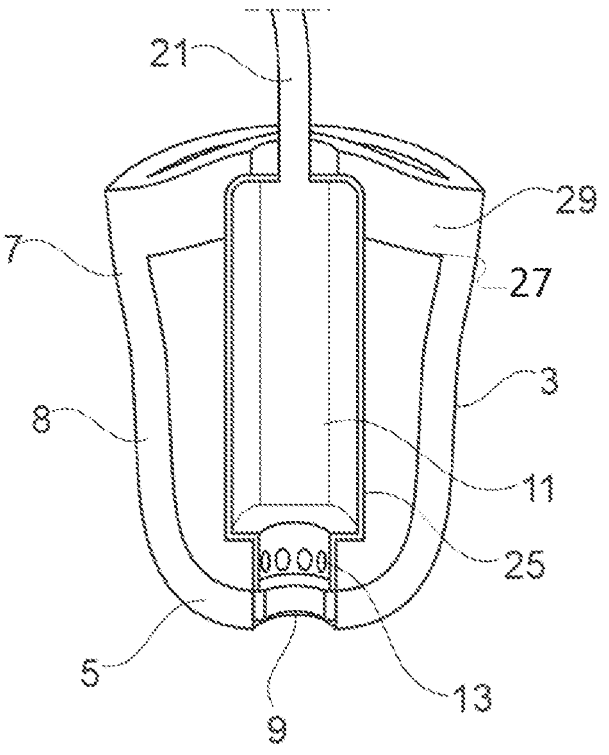
Figure 7B:
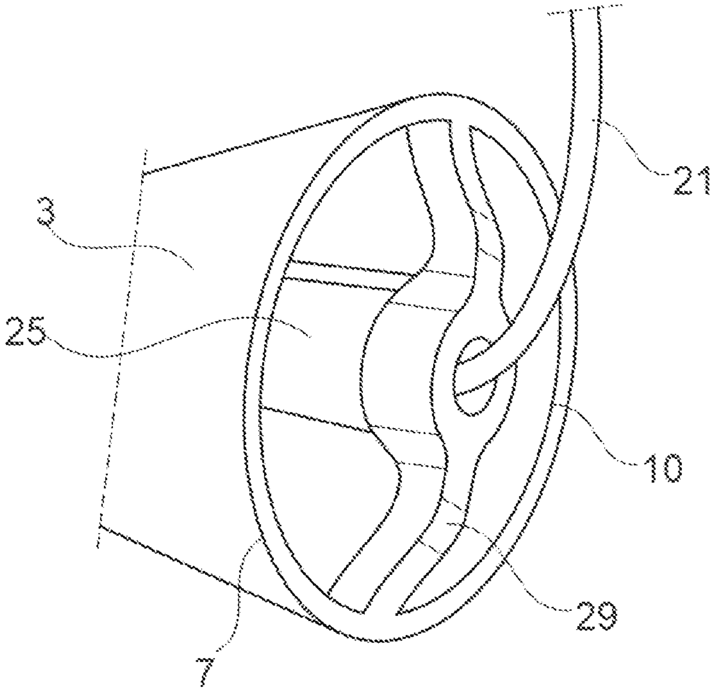

FIGS. 7A and 7B schematically illustrate a hearing device part according to some embodiments.

In FIG. 7A is shown in a cutaway drawing an earmould 3, which may be part of an in-the-ear (ITE) part 1 of a hearing device. A connector 21 connects a receiver 11 within a receiver housing 25 arranged in the earmould 3 to another part of the hearing device, such as a BTE part. The earmould 3 has an elongated shape and is configured for placement at least partially within an ear canal of the intended user. The earmould may be made from a hard material, such as a hard polymer or a metal, or from a softer material, such as a rubber-like polymer, such as an acrylic, and may be moulded to have an outer shape that at least in part conforms to the shape of a specific user's ear canal.

The earmould 3 has a front end 5, having a front opening 9, a rear end 7, having a rear opening 10, opposite the front end, and a middle part 8. The rear end of the earmould 3 in FIG. 7A is not closed off to the exterior of the earmould such that the earmould has an open shell structure.

The earmould 3 is configured such that the front end 5 can be positioned to face the tympanic membrane of the user's ear canal during use of the hearing device. A receiver housing 25 is arranged within the earmould such that sound produced by the receiver will exit the earmould via the front opening 9 at the front end. A front filter may be positioned at the front opening to diminish the amount of contaminants that may otherwise enter through the front opening.

The receiver housing 25 is held within the earmould by a supporting structure 29. The supporting structure 29 may extend from the inside wall 27 and is arranged closer to the rear end 7 than the front end 5 of the earmould. The supporting structure may be attached to the earmould using known methods, such as using an adhesive, e.g. glue. Having the supporting structure primarily towards the rear end of the earmould saves space at the front of the earmould, which is advantageous as the available space at the front is usually more limited than at the back. If the front of the earmould has to be made larger, this may reduce the insertion depth of the earmould within the user's ear canal and/or make it more difficult to obtain a good fit for the earmould within the ear canal.

The supporting structure 29 shown in FIGS. 7A and 7B is made from a flexible material, which can stretch to accommodate the receiver housing 25 both during and after insertion of the receiver housing within the earmould 3. The supporting structure 29 may be made from, or at least comprise, a material that is softer than the material used to make the earmould, or at least softer than the material used to make the middle part of the earmould.

The supporting structure is shaped to cover the part of the receiver housing, where the wired connection 21 extends from and has a hole through which the wired connection extends through. The wired connection 21 extends from the end of the elongated receiver housing 25, which faces away from the front end 5 of the earmould, and the supporting structure 29 is shaped to fit over the end, and further to extend some way along the receiver housing so as to form a cavity shaped to fit the end of the receiver housing. The flexible supporting structure 29 is configured to be able to provide some give, when the receiver housing 25 is inserted into the earmould and to provide the retention force necessary to hold the receiver housing within the earmould.

The wired connection 21 may either be permanently fixed to the receiver housing 25 or removably attached to the receiver housing, for example using a known wire interface. If the wired connection is fixed to the receiver housing 25, the other end of the wired connection must removably attached in order for the receiver housing to be removably arranged in the earmould. If the wired connection 21 is removably attached to the receiver housing 25, the housing may be inserted in the earmould and fixated in the supporting structure before the wired connection 21 is attached to the housing 25.

The supporting structure 29 may be configured to fixate the receiver housing 25 in place within the earmould on its own, i.e. even when the wired connection is not there, or the wired connection extending through the hole in the supporting structure may assist in holding the receiver housing 25 in place by limiting the movement of the receiver housing 25.

Optionally, the hearing device comprises a soft material at the front opening 9 into which the receiver housing 25, or an active vent 13 coupled to the receiver housing, is inserted, the soft material being configured to provide give during the insertion. The soft material at the front opening can be configured to allow the receiver housing to be removed from the earmould, if needed. The soft material at the front opening 9 may be a fixation tip, as discussed elsewhere, and so be a part of the supporting structure.

The receiver housing 25 shown in FIG. 7A has an active vent 13 coupled to it, for example it may be an active vent receiver, wherein an active vent is built-in into the receiver. In a preferred embodiment where the front opening is made from a soft material, for the active vent to function satisfactorily the soft material at the front opening is configured to provide an acoustic seal between the ear canal of the user and the inner space of the earmould which is open to the exterior of the user's ear canal. This allow for ambient sound to pass from the exterior environment to the ear canal of the user, when the valve within the active vent is in an open state, and for ambient sound to be hindered from entering the ear canal of the user, when the valve is in a closed state.

Further, in an optional embodiment, where the front opening 9 is made from a softer material than the earmould, the soft material at the front opening 9 may be configured to allow the receiver housing and active vent to have some mobility within the earmould, which increases the comfort for the user, while the hearing device is worn.

A rear filter (not shown) may be arranged so as to be positioned at the rear opening, or to be positioned in-between the rear opening 9 and the valve of the active vent 13. Such a rear filter may be configured to allow ambient sound to pass therethrough and further configured to hinder contaminants from entering the space between the rear filter and the vent. To hinder contaminants from bypassing the filter, the rear filter may be made from a flexible material. For example, the rear filter may be made from a woven material or a foam material. When the receiver housing 25 is secured within the earmould, the rear filter creates a partition between the inside of the earmould and the exterior from where contamination may arrive.

FIG. 7B shows a view towards the rear end 7 of the earmould 3 shown in FIG. 7A to show another view of the supporting structure 29 with the receiver housing 25 held by the supporting structure 29 such that the housing is held in place within the earmould 3. The wired connection 21 extends through a hole in the supporting structure 29.

Figure 8A:
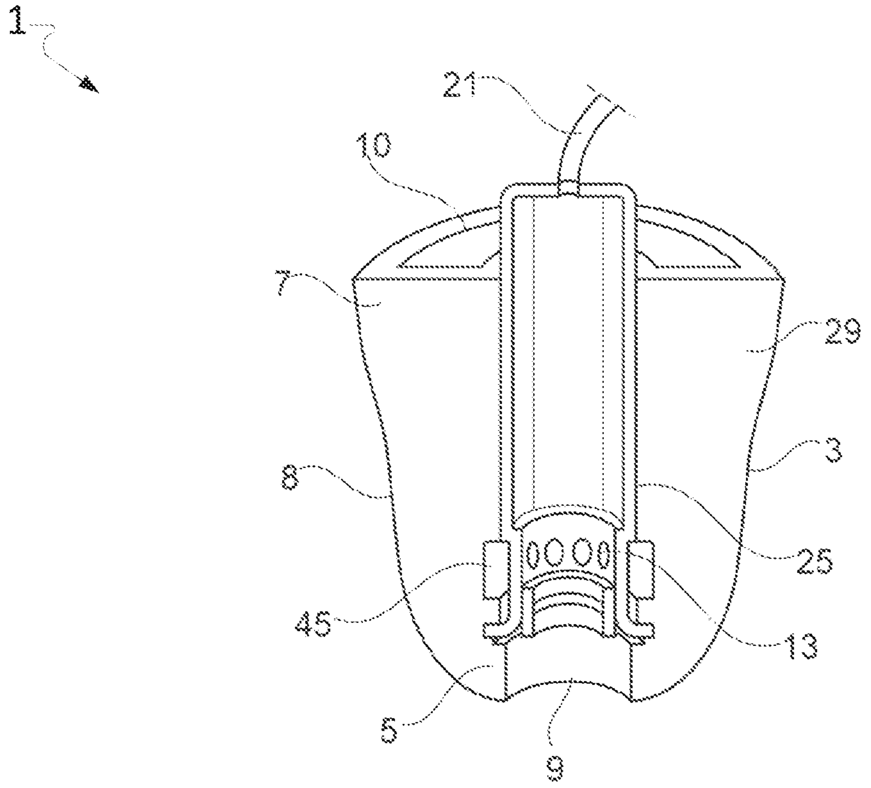
Figure 8B:
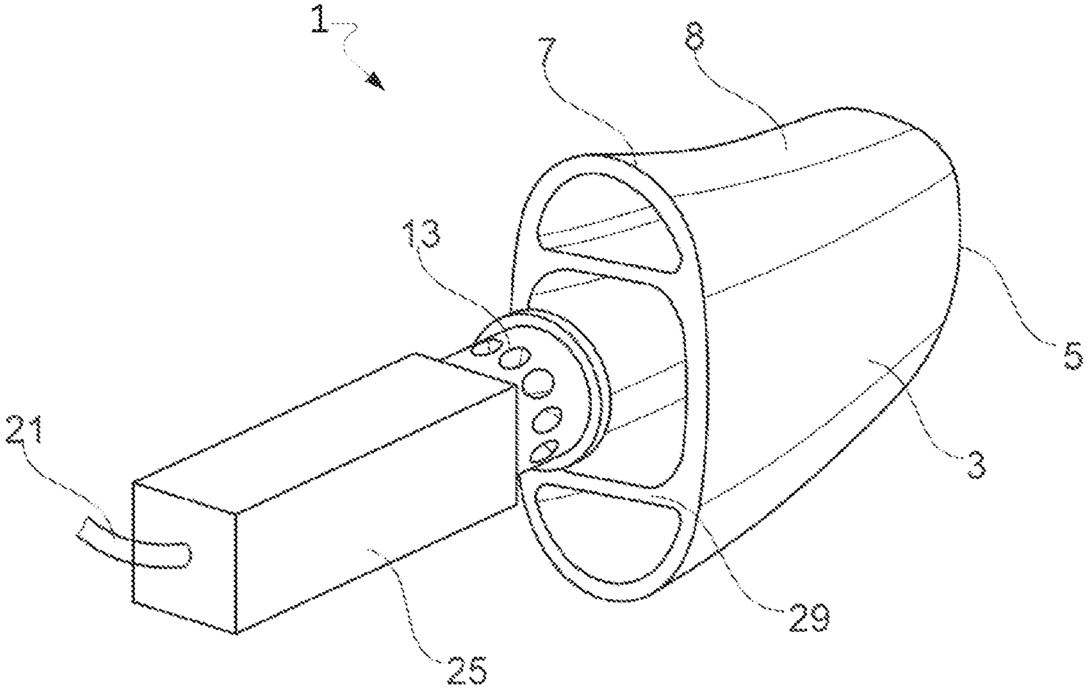

FIGS. 8A and 8B schematically illustrate in a hearing device part according to some embodiments.

In FIG. 8A is shown in a cutaway drawing an earmould 3, which may be part of an in-the-ear (ITE) part 1 of a hearing device. A connector 21 connects a receiver 11 within a receiver housing 25 arranged in the earmould 3 to another part of the hearing device, such as a BTE part. The earmould 3 has an elongated shape and is configured for placement at least partially within an ear canal of the intended user. The earmould may be made from a hard material, such as a hard polymer or a metal, or from a softer material, such as a rubber-like polymer, such as an acrylic, and may be moulded to have an outer shape that at least in part conforms to the shape of a specific user's ear canal.

The earmould 3 has a front end 5, having a front opening 9, a rear end 7, having a rear opening 10, opposite the front end, and a middle part 8. The rear end of the earmould 3 in FIG. 8A is not closed off to the exterior of the earmould such that the earmould has an open shell structure.

The earmould 3 is configured such that the front end 5 can be positioned to face the tympanic membrane of the user's ear canal during use of the hearing device. A receiver housing 25 is arranged within the earmould such that sound produced by the receiver will exit the earmould via the front opening 9 at the front end. A front filter may be positioned at the front opening to diminish the amount of contaminants that may otherwise enter through the front opening.

The receiver housing 25 is held within the earmould by a supporting structure 29. Optionally, the supporting structure 29 comprises a flexible material that is softer than the material used to make the earmould 3. The supporting structure 29 is made from a flexible material, which can stretch to accommodate the receiver housing 25 both during and after insertion of the receiver housing within the earmould 3. The flexible supporting structure 29 is configured to be able to provide some give, when the receiver housing 25 is inserted into the earmould and to provide the retention force necessary to hold the receiver housing 25 within the earmould 3.

The supporting structure 29 extends from the inside wall 27 of the earmould and part of it forms a tube in which the receiver housing 25 fits. The tubular shape is sized to fit snugly around the elongated body of the receiver housing 25 and thus create a retention force. The supporting structure 29 may be attached to the earmould 3 using known methods, such as using an adhesive, e.g. glue. The tubular supporting structure 29 can be arranged to be primarily towards the rear end of the earmould to save space at the front of the earmould. The supporting structure 29 may be configured to allow the receiver housing 25 to be removed from the earmould 3, if needed.

The receiver housing 25 shown in FIG. 8A has an active vent 13 coupled to it, for example it may be an active vent receiver, wherein an active vent is built-in into the receiver. For the active vent to function satisfactorily a part of the supporting structure at or near the front opening 9 is configured to provide an acoustic seal between the ear canal of the user and the inner space of the earmould which is open to the exterior of the user's ear canal. This allow for ambient sound to pass from the exterior environment to the ear canal of the user, when the valve within the active vent is in an open state, and for ambient sound to be hindered from entering the ear canal of the user, when the valve is in a closed state. Further, the supporting structure 29 has one or more fluid openings 45 that are positioned and configured to allow for fluid such as air to pass such that the supporting structure 29 does not interfere with the functionality of the active vent 13.

Further, in an optional embodiment where the supporting structure 29 is made from softer material than the earmould, the flexible and soft supporting structure 29 may allow the receiver housing 25 and active vent 13 to have some mobility within the earmould, which increases the comfort for the user while the hearing device is worn.

A rear filter (not shown) may be arranged so as to be positioned at the rear opening, or to be positioned in-between the rear opening 9 and the valve of the active vent 13. Such a rear filter may be configured to allow ambient sound to pass therethrough and further configured to hinder contaminants from entering the space between the rear filter and the vent. To hinder contaminants from bypassing the filter, the rear filter may be made from a flexible material. For example, the rear filter may be made from a woven material or a foam material. When the receiver housing 25 is secured within the earmould, the rear filter creates a partition between the inside of the earmould and the exterior from where contamination may arrive.

FIG. 8B shows a view towards the rear end 7 of the earmould 3 to show another view of the supporting structure 29 without the receiver housing 25 inserted, whereby the 3D structure of the supporting structure is better visualised together with FIG. 8A.

Figure 9:
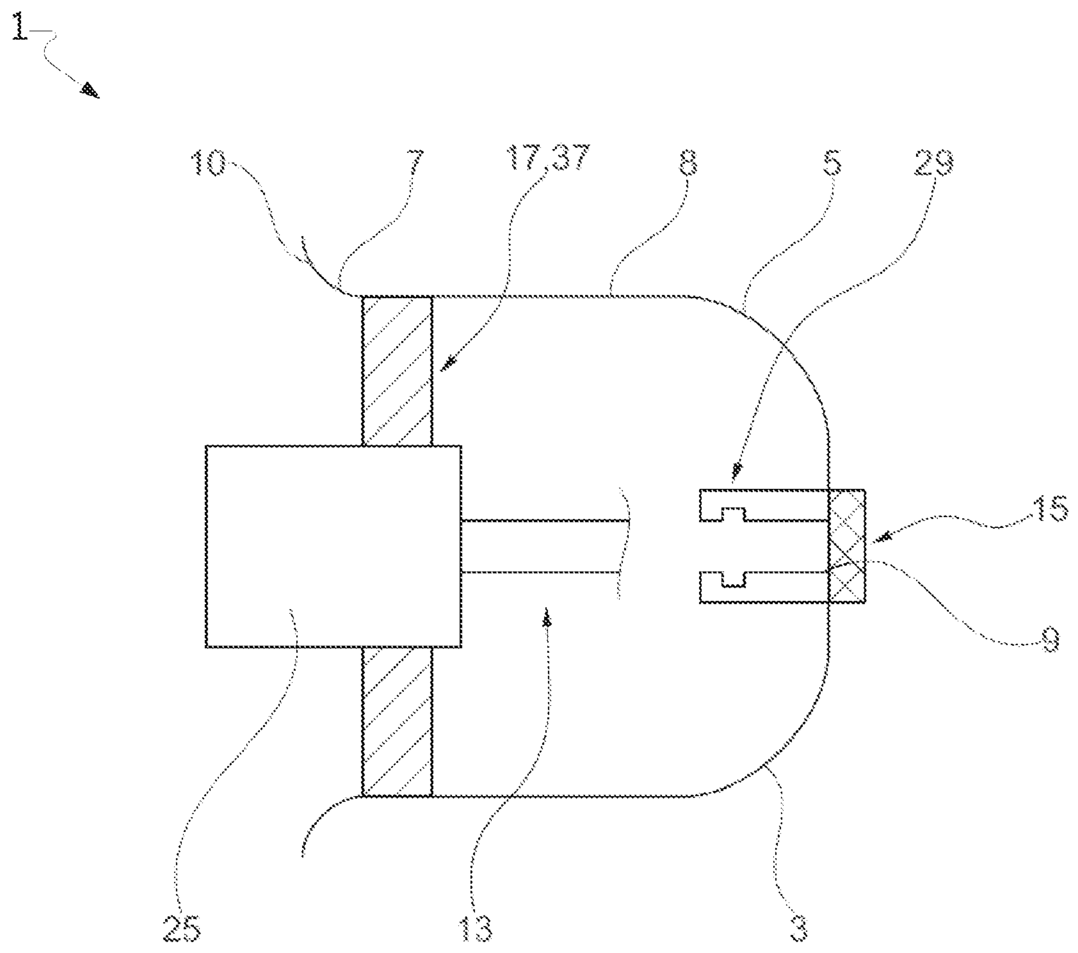

FIG. 9 schematically illustrates in a cutaway drawing a hearing device part according to some embodiments. Shown is an earmould 3, which may be part of an in-the-ear (ITE) part 1 of a hearing device. The earmould 3 has an elongated shape and is configured for placement at least partially within an ear canal of the intended user. The earmould may be made from a hard material, such as a hard polymer or a metal, or from a softer material, such as a rubber-like polymer, such as an acrylic, and may be moulded to have an outer shape that at least in part conforms to the shape of a specific user's ear canal.

The earmould 3 has a front end 5, having a front opening 9, a rear end 7, having a rear opening 10, opposite the front end, and a middle part 8. The rear end of the earmould 3 is not closed off to the exterior of the earmould such that the earmould has an open shell structure.

The earmould 3 is configured such that the front end 5 can be positioned to face the tympanic membrane of the user's ear canal during use of the hearing device. A receiver housing 25 is arranged within the earmould such that sound produced by the receiver will exit the earmould via the front opening 9 at the front end. A front filter 15 is positioned at the front opening 9 to diminish the amount of contaminants that may otherwise enter through the front opening.

The receiver housing 25 is held within the earmould by a supporting structure 29. The supporting structure 29 is optionally made from a material that is softer than the material used to make the earmould 3. The supporting structure 29 is made from a material, which can stretch to accommodate the receiver housing 25 both during and after insertion of the receiver housing within the earmould 3. The supporting structure 29 is positioned inside the earmould at the front end 5 and near the front opening 9.

The supporting structure 29 is shaped to accommodate part of an active vent 13, which is coupled to a receiver housing 25, and configured to hold the active vent, and thereby the receiver housing 25, in place within the earmould 3.

The supporting structure 29 may be attached to the earmould 3 using known methods, such as using an adhesive, e.g. glue, and the supporting structure 29 may be configured to allow the receiver housing 25 to be removed from the earmould 3, if needed.

The earmould 3 further comprises a flexible and resilient element 37 that is configured to cushion the receiver housing 25 against an inside wall of the earmould 3. The flexible and resilient element may for example be a foam material. The cushioning by the flexible and resilient element is configured to allow the receiver housing 25 to move within the earmould, such as when the user talks or chews, which provides increased comfort for the user of the hearing device. The flexible and resilient element 37 may be attached to the receiver housing using a bellyband that secures around the receiver housing 25. The flexible and resilient element 37 can be made to be removable, for example by making it possible to remove the bellyband on which the element is attached. In this way, the flexible and resilient element 37 can be extracted from within the earmould 3 and cleaned or replaced, if needed.

The flexible and resilient element 37 may be additionally configured to act as a rear filter 17 and may be arranged so as to be positioned at the rear opening or to be positioned in-between the rear opening 9 and the valve of the active vent 13. To hinder contaminants from bypassing the rear filter 17, the rear filter may be made from a flexible material such as a woven material or a foam material. When the receiver housing 25 is secured within the earmould 3, the rear filter 17 creates a partition between the inner space of the earmould 3 and the exterior of the earmould from where contamination may arrive. The rear filter 17 is configured so as to be acoustically open such that the functionality of the active vent is not compromised and the system will behave acoustically as a fully open vented earmould when the valve is in an open state.

Figure 10A:
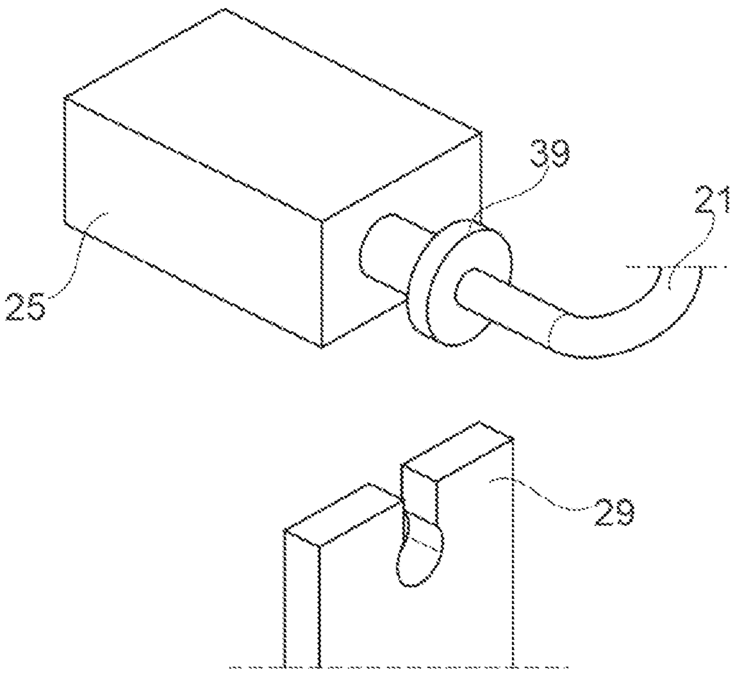
Figure 10B:
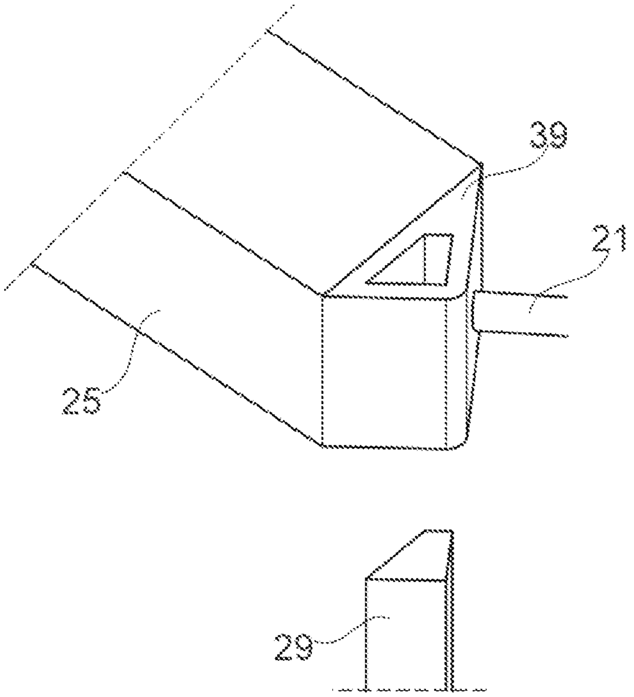

FIGS. 10A and 10B schematically illustrate a receiver housing 25 comprising an interlocking element 39 and part of a supporting structure 29 according to some embodiments.

FIG. 10A shows a receiver housing 25 comprising an interlocking element 39, which has a cylindrical shape. One end of the cylindrical shape is attached to the receiver housing 25 and the other end of the cylindrical shape has a stopper. A wired connection 21 extends from the interlocking element 39 and connects to the receiver through the centre of the cylindrical shape.

Shown is also part of a supporting structure 29 comprising a cut-out that is shaped to fit around the cylindrical shape of the interlocking element 39. The supporting structure 29 is coupled to an earmould, such as to an inside wall of an earmould.

The interlocking element 39 and the supporting structure 29 are configured to interlock with each other. When the cylindrical shape of the interlocking element 39 is introduced into the cut-out of the supporting structure, the interlocking element and the supporting structure interlock with each other and the stopper on the interlocking element helps to keep the receiver housing in place in relation to the supporting structure 29.

FIG. 10B shows a receiver housing 25 comprising an interlocking element 39. The interlocking element 39 is part of, or attached to, one end of the receiver housing 25. The interlocking element 39 comprises a hole extending through the interlocking element in a direction substantially parallel to the end surface of the receiver housing 25. A wired connection 21 extends from the receiver housing 25 and may extend through a part of the interlocking element 39.

Shown is also part of a supporting structure 29 that is shaped to fit within the hole in the interlocking element 39. The supporting structure 29 is coupled to an earmould, such as to an inside wall of an earmould.

The interlocking element 39 and the supporting structure 29 are thus configured to interlock with each other. The receiver housing 25 may attached to the supporting structure 29 by applying force to push the interlocking element 39 onto the supporting structure 29 such that the part of the supporting structure 29 fitted for the hole sits within the hole of the interlocking element 39. In this way, the receiver housing 25 is held in place in relation to the supporting structure 29.

Figure 11:
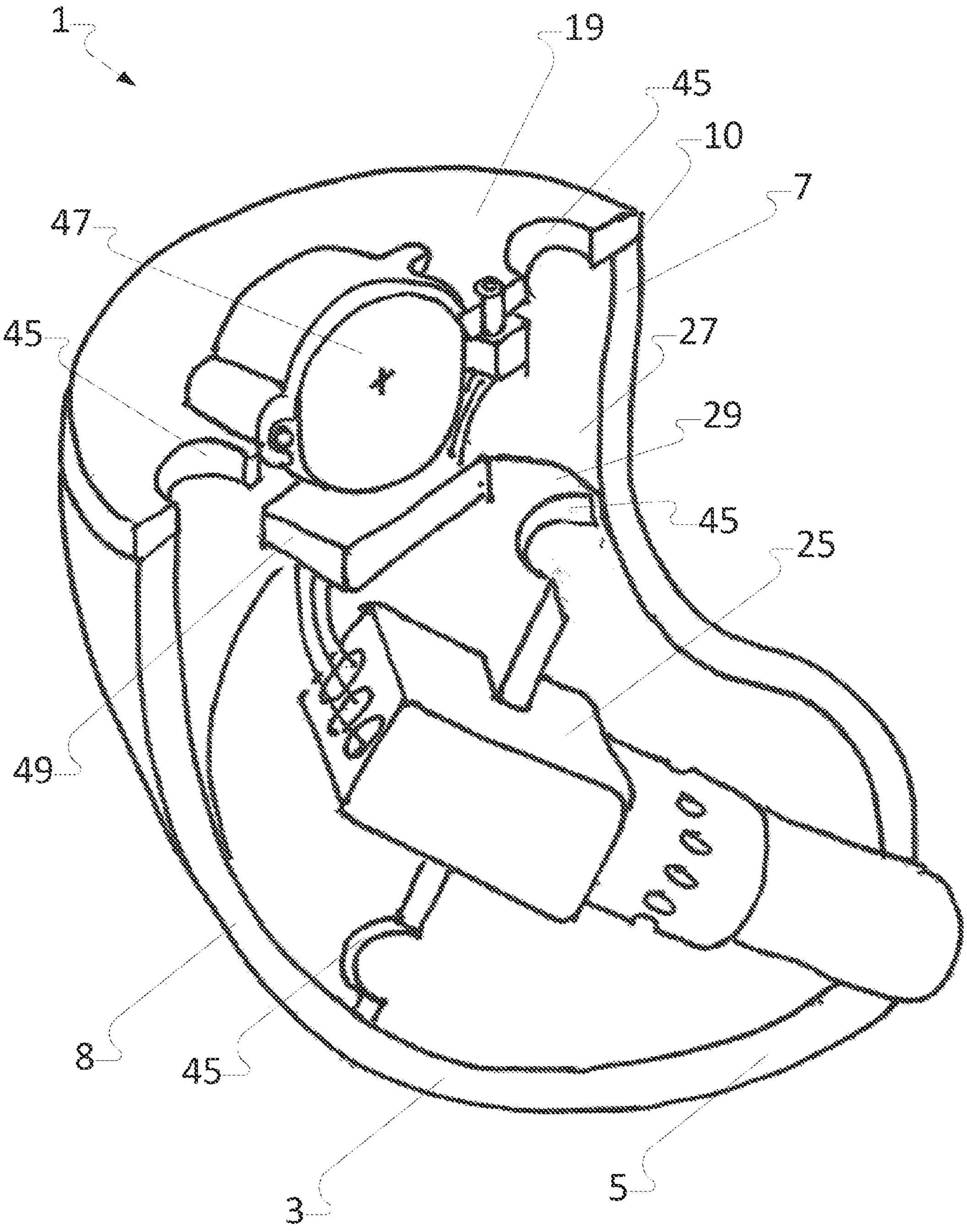

FIG. 11 schematically illustrates in a cutaway drawing a hearing device according to some embodiments.

In FIG. 11 is shown in a cutaway drawing of an ITE hearing device 1 comprising an earmould 3. The earmould 3 has an elongated shape and is configured for placement at least partially within an ear canal of the intended user and may be made custom for a particular user by being shaped to conform to an ear canal of that user.

The earmould is made from a hard material, such as a hard polymer, which for many users increases the comfort during use of the hearing device.

The earmould 3 has a front end 5, having a front opening 9, a rear end 7, having a rear opening 10, opposite the front end, and a middle part 8. The rear end of the earmould 3 is closed off to the exterior of the earmould by a faceplate 19, which has a door to a battery compartment, wherein a battery 47 is housed.

The earmould 3 is configured such that the front end can be positioned to face the tympanic membrane of the user's ear canal during use of the hearing device. A receiver housing 25 comprises a receiver 11 and is arranged within the earmould such that sound produced by the receiver will exit the earmould through an active vent 13 and through the front opening 9 at the front end. A front filter may be positioned at the front opening to diminish the amount of contaminants that may otherwise enter through the front opening. The receiver housing 25 may comprise various electronic components and further electronic components 49 may be arranged inside the earmould 3 outside of the receiver housing 25.

The earmould 3 is configured to have a sound passage, which extends between the front opening 9 and the rear end 7, to allow for air to move between the front opening and an exterior of the earmould.

The active vent 13 is positioned in-between active opening and comprises a valve. The valve allows for the active vent to have an open state and a closed state, wherein, in the open state, the valve provides a fluid connection through the sound passage, and wherein, in the closed state, the valve hinders fluid connection through the sound passage. Thus, when the valve in the vent is closed, air is hindered in its movement between the front opening 9 and the exterior of the earmould during use of the earmould. Conversely, opening the valve allows air to move through the sound passage. The receiver and active vent may be integrated in an active vent receiver.

The receiver housing 25 is held within the earmould by a supporting structure 29 extending from the inside wall 27. Having the supporting structure more towards the rear end of the earmould than at the front saves space at the front of the earmould, which is advantageous as the available space at the front is usually more limited than at the back. If the front of the earmould has to be made larger, this may reduce the insertion depth of the earmould within the user's ear canal and/or make it more difficult to obtain a good fit for the earmould within the ear canal.

The supporting structure 29 is shaped as a disc, i.e. it has a flat shape, and is, in the embodiment shown in FIG. 11, coupled to the inside wall 27 all around its outer circumference. Within the disc-shaped supporting structure 29 is an aperture inside which the receiver housing 25 is held. The disc-shaped supporting structure 29 is positioned between the active vent 13 and the faceplate 19.

The faceplate 19 and the disc-shaped supporting structure 29 each have one or more fluid openings 45 that form part of the sound passage that allows air to flow from outside the ear canal during use of the hearing device and to the part of the interior of the earmould, which comprises the active vent.

Optionally, the supporting structure 29 is at least partially made from a material that is softer than the material used to make the earmould 3 and can be configured to allow some movement of the receiver housing 25. This freedom of the receiver housing 25 within the earmould 3 can lead to greater comfort for the user during use.

In the optional embodiment where the supporting structure 29 is made from a softer material than the earmould, the hearing device may comprise a soft material at the front opening 9 into which the receiver housing 25, or an active vent 13 coupled to the receiver housing, is inserted, the soft material being configured to provide give during the insertion. The soft material at the front opening may be part of the supporting structure holding the receiver housing 25 in place within the earmould 3. Further, the soft material at the front opening may be configured to provide an acoustic seal between the ear canal of the user and the inner space of the earmould.

In the optional embodiment where the supporting structure 29 is made from a softer material than the earmould, the supporting structure 29, the soft material at the front opening, the receiver housing 25 and the faceplate may each be configured to allow the receiver housing to be removed from the earmould, if needed. It may also be possible to disconnect the receiver housing 25 from further electronic components 49 of the hearing device 1. In some embodiments, the supporting structure 29, the soft material at the front opening, and the faceplate 19 may all be removably attached to the earmould 3 to allow a person, such as the user, a hearing aid dispenser or a technician, to exchange part of the hearing device.

Figure 12:
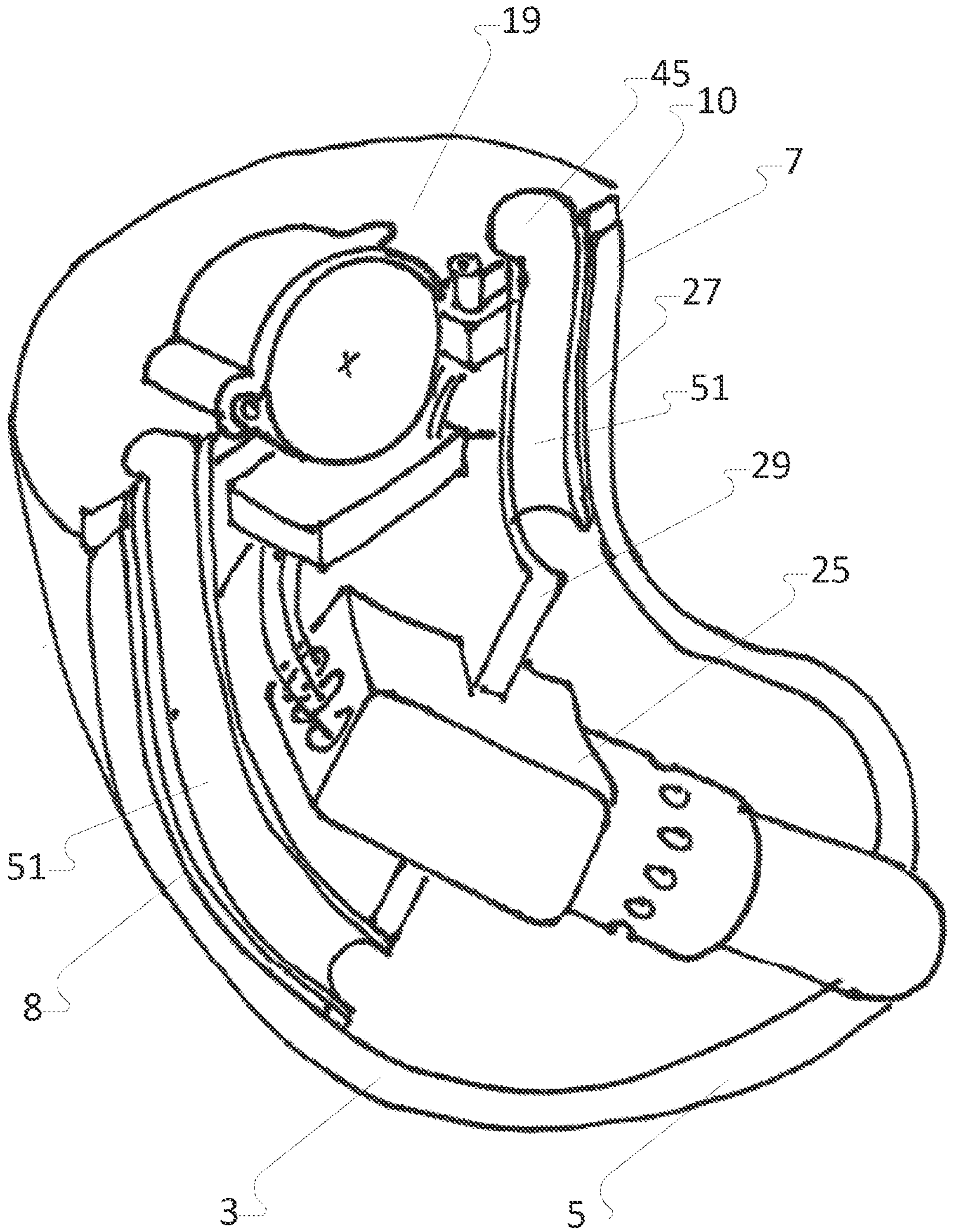

FIG. 12 schematically illustrates in a cutaway drawing a hearing device according to some embodiments.

In FIG. 12 is shown in a cutaway drawing of an ITE hearing device comprising an earmould 3 similar to that shown in FIG. 11. In the embodiment shown in FIG. 12 the fluid openings 45 in the faceplate 19 and the fluid openings 45 in the disc-shaped supporting structure 29 are connected by a fluid tube 51. Each fluid tube 51 extends between a fluid opening in the faceplate 19 and a fluid opening in the disc-shaped supporting structure 29. By having the fluid tubes 51 the sound travelling from the exterior of the earmould 1 during use of the hearing device is guided to the part of the interior of the earmould, which comprises the active vent 13. Further, by having the fluid tubes 51 any sound originating in the interior of the earmould 3 in the space between the faceplate 19 and the disc-shaped supporting structure 29 can be dampened such that it is diminished or removed before travelling to the active vent 13.

LIST OF REFERENCES

1 in-ear-part (ITE) part
3 earmould
5 front end
7 rear end
8 middle part
9 front opening
10 rear opening
11 receiver
13 active vent
15 front filter
17 rear filter
19 faceplate
21 wired connection
23 hollow cavity
25 receiver body/receiver housing
27 inside wall of earmould
29 supporting structure
31 filter holding element
35 fixation tip
37 foam/flexible and resilient element
39 interlocking element
41 first supporting structure
43 second supporting structure
45 fluid opening
47 battery
49 electronic components
51 fluid tube

The invention claimed is:

1. An in-the-ear (ITE) part configured for placement at least partially within an ear canal of a user, the ITE part comprising:

a connector configured for coupling with a BTE part, the BTE part configured to be worn behind a pinna of the user;

an earmould comprising a front end, a rear end, and a hollow cavity, wherein the front end of the earmould is configured to face a tympanic membrane of the user during use, the front end comprising a front opening, the front opening comprising a front filter, and the rear end comprising a rear opening;

a receiver at least partly in the hollow cavity;

a sound passage extending between the front opening and the rear end;

an active vent comprising a valve, wherein when the valve is in an open state, the valve provides a fluid connection through the sound passage, and wherein when the valve is in a closed state, the valve hinders the fluid connection through the sound passage; and a rear filter surrounding a part of the receiver.

2. The ITE part according to claim 1, wherein the earmould is a hard earmould.

3. The ITE part according to claim 1, wherein the earmould is made of an acrylic.

4. The ITE part according to claim 1, wherein the rear end of the earmould is an open shell structure.

5. The ITE part according to claim 1, wherein the rear filter comprises a filter mesh or a reticulated foam filter.

6. The ITE part according to claim 1, wherein the receiver is configured to be removably arranged within the earmould.

7. The ITE part according to claim 1, wherein the earmould further comprises a filter holding element, which extends from a part of the earmould, the filter holding element being configured to secure the rear filter.

8. The ITE part according to claim 1, wherein the active vent is between the receiver and the front opening.

9. The ITE part according to claim 1, wherein the front opening is in fluid communication with an exterior of the earmould.

10. The ITE part according to claim 1, wherein the active vent is closer to the front end than to the rear end of the earmould.

11. A hearing device comprising:

the ITE part according to claim 1, and the BTE part;

wherein the ITE part is coupled to the BTE part via the connector.

12. The ITE part according to claim 1, further comprising a supporting structure configured to hold the receiver, wherein the supporting structure is located closer to the rear end of the earmould than to the front end of the earmould.

13. The ITE part according to claim 1, further comprising a supporting structure configured to hold the receiver, wherein the supporting structure comprises a first opening configured to accommodate a part of the receiver, and a second opening defining a part of the sound passage.

14. The ITE part according to claim 1, further comprising a supporting structure configured to hold the receiver, and wherein at least a part of the sound passage is between the supporting structure and a wall of the earmould.

15. An in-the-ear (ITE) part configured for placement at least partially within an ear canal of a user, the ITE part comprising:

a connector configured for coupling with a BTE part, the BTE part configured to be worn behind a pinna of the user;

an earmould comprising a front end, a rear end, and a hollow cavity, wherein the front end of the earmould is configured to face a tympanic membrane of the user during use, the front end comprising a front opening, the front opening comprising a front filter, and the rear end comprising a rear opening;

a receiver in the hollow cavity;

a sound passage extending between the front opening and the rear end;

an active vent comprising a valve, wherein when the valve is in an open state, the valve provides a fluid connection through the sound passage, and wherein when the valve is in a closed state, the valve hinders the fluid connection through the sound passage;

a faceplate that is attached to the rear end of the earmould; and a filter coupled to the faceplate, wherein the filter extends around at least a part of the connector.

16. The ITE part according to claim 15, wherein the faceplate is removably attached to the earmould.

17. The ITE part according to claim 15, wherein the filter is incorporated into the faceplate.

18. The ITE part according to claim 15, wherein the filter is removably incorporated into the faceplate.

19. An in-the-ear (ITE) part configured for placement at least partially within an ear canal of a user, the ITE part comprising:

a connector configured for coupling with a BTE part, the BTE part configured to be worn behind a pinna of the user;

an earmould comprising a front end, a rear end, and a hollow cavity, wherein the front end of the earmould is configured to face a tympanic membrane of the user during use, the front end comprising a front opening, the front opening comprising a front filter, and the rear end comprising a rear opening;

a receiver in the hollow cavity;

a sound passage extending between the front opening and the rear end;

an active vent comprising a valve, wherein when the valve is in an open state, the valve provides a fluid connection through the sound passage, and wherein when the valve is in a closed state, the valve hinders the fluid connection through the sound passage; and a rear filter at the rear opening, or in the hollow cavity between the rear opening and the active vent;

wherein the receiver comprises a receiver body, the rear filter being removably attached to the receiver body, and wherein when the rear filter is removably attached to the receiver body, the rear filter extends away from the receiver body at a non-zero angle with respect to a surface of the receiver body.

20. The ITE part according to claim 19, wherein the rear filter surrounds the receiver body.

* * * * *